(12) United States Patent
Beiler et al.

(10) Patent No.: US 11,660,957 B2
(45) Date of Patent: May 30, 2023

(54) VEHICLE DRIVE SYSTEM FOR A SELF-PROPELLED TRAILER

(71) Applicant: New Heights, LLC, Leola, PA (US)

(72) Inventors: Aaron Jay Beiler, Gap, PA (US); William Fisher, Paradise, PA (US); Raymond Beiler, New Holland, PA (US); Jeremiah Weaver, Narvon, PA (US)

(73) Assignee: New Heights, LLC, Leola, PA (US)

( * ) Notice: Subject to any disclaimer, the term of this patent is extended or adjusted under 35 U.S.C. 154(b) by 219 days.

(21) Appl. No.: 17/024,823

(22) Filed: Sep. 18, 2020

(65) Prior Publication Data

US 2021/0001718 A1 Jan. 7, 2021

Related U.S. Application Data

(63) Continuation-in-part of application No. 16/599,820, filed on Oct. 11, 2019.
(Continued)

(51) Int. Cl.
*B60K 17/02* (2006.01)
*B62D 59/04* (2006.01)
(Continued)

(52) U.S. Cl.
CPC ............ *B60K 17/02* (2013.01); *B60K 17/043* (2013.01); *B62D 59/04* (2013.01); *F16D 11/14* (2013.01);
(Continued)

(58) Field of Classification Search
CPC ...... B60K 17/02; B60K 17/043; B60K 17/22; B60K 17/356; B60K 17/354;
(Continued)

(56) References Cited

U.S. PATENT DOCUMENTS 4,185,713 A 1/1980 Williams et al.
4,588,322 A 5/1986 Shoemaker et al.
(Continued)

FOREIGN PATENT DOCUMENTS

EP 3354506 A2 8/2018
EP 3381773 A1 10/2018
(Continued)

OTHER PUBLICATIONS

Extended European Search Report, European Patent Application No. 18150656.9, dated Oct. 5, 2018, 11 pages.
(Continued)

*Primary Examiner* — Tony H Winner
*Assistant Examiner* — Marlon A Arce
(74) *Attorney, Agent, or Firm* — Barley Snyder

(57) ABSTRACT

A vehicle drive system is provided and generally includes a hub assembly, a drive assembly and a clutch assembly. The hub assembly having wheel hub upon which a wheel assembly is secured. The drive assembly is configured to selectively transmit a motive force to cause the hub to turn. The drive assembly includes a motor with a rotatable motor output shaft, a transmission assembly connected to the motor and receiving in the rotatable motor output shaft into an input opening therein, and a driveshaft connected to an output from the transmission assembly. The clutch assembly connected to the hub assembly and engagebale to the driveshaft.

9 Claims, 21 Drawing Sheets

A

Related U.S. Application Data

(60) Provisional application No. 62/744,901, filed on Oct. 12, 2018.

(51) Int. Cl.
  *B60K 17/04* (2006.01)
  *F16D 11/14* (2006.01)
  *B60K 17/356* (2006.01)
  *B60K 17/22* (2006.01)
  *F16D 11/00* (2006.01)

(52) U.S. Cl.
  CPC ............ *B60K 17/22* (2013.01); *B60K 17/356* (2013.01); *F16D 2011/006* (2013.01)

(58) Field of Classification Search
  CPC .......... B60K 17/358; B60K 2007/0038; B60K 7/0007; B62D 59/04; B62D 13/04; B62D 7/142; B62D 63/06; F16D 11/14; F16D 2011/006; F16D 2011/004; F16D 2011/008; B60Y 2200/49; B60Y 2400/406; B60Y 2400/421
  See application file for complete search history.

(56) References Cited

U.S. PATENT DOCUMENTS

| | | | |
|---|---|---|---|
| 5,261,801 A | 11/1993 | Stone | |
| 6,312,238 B1 | 11/2001 | Gerlach | |
| 6,422,369 B1 | 7/2002 | McCalla | |
| 6,458,057 B2 * | 10/2002 | Massaccesi | B60K 17/08 475/330 |
| 8,292,776 B1 | 10/2012 | Higman et al. | |
| 8,795,130 B2 | 8/2014 | Forrest | |
| 9,010,876 B2 | 4/2015 | Stelter et al. | |
| 2002/0070065 A1 | 6/2002 | Bracke et al. | |
| 2002/0112934 A1 | 8/2002 | Karambelas et al. | |
| 2002/0125060 A1 | 9/2002 | Cigal | |
| 2004/0200648 A1 | 10/2004 | Tarasinski et al. | |
| 2007/0163253 A1 | 7/2007 | Sakakura et al. | |
| 2009/0197730 A1 | 8/2009 | Berhan | |
| 2011/0197575 A1 | 8/2011 | Pringent et al. | |
| 2012/0187747 A1 | 7/2012 | Dagh et al. | |
| 2012/0240724 A1 | 9/2012 | Welschof et al. | |
| 2013/0160436 A1 | 6/2013 | Scheibel | |
| 2015/0096822 A1 | 4/2015 | Sato et al. | |
| 2015/0283892 A1 | 10/2015 | Larsson et al. | |
| 2016/0121722 A1 * | 5/2016 | Roberts | B60K 26/02 180/242 |
| 2018/0194410 A1 * | 7/2018 | Beiler | B60K 7/0015 |
| 2020/0114993 A1 | 4/2020 | Beiler et al. | |
| 2020/0290691 A1 * | 9/2020 | Beiler | B60K 17/046 |

FOREIGN PATENT DOCUMENTS

| | | |
|---|---|---|
| FR | 1309984 A | 3/1963 |
| FR | 2409162 A1 | 6/1979 |

OTHER PUBLICATIONS

Communication—Extended European Search Report, Application No. 20186901.3-1012, dated Oct. 16, 2020, 9 pp.
International Search Report and Written Opinion, Application No. PCT/US2021/050904, Dated: Jan. 12, 2022, 13 pages.
International Preliminary Report of Patentability and Written Opinion dated Mar. 30, 2023, corresponding to Application No. PCT/US2021/050904, 8 pages.

* cited by examiner

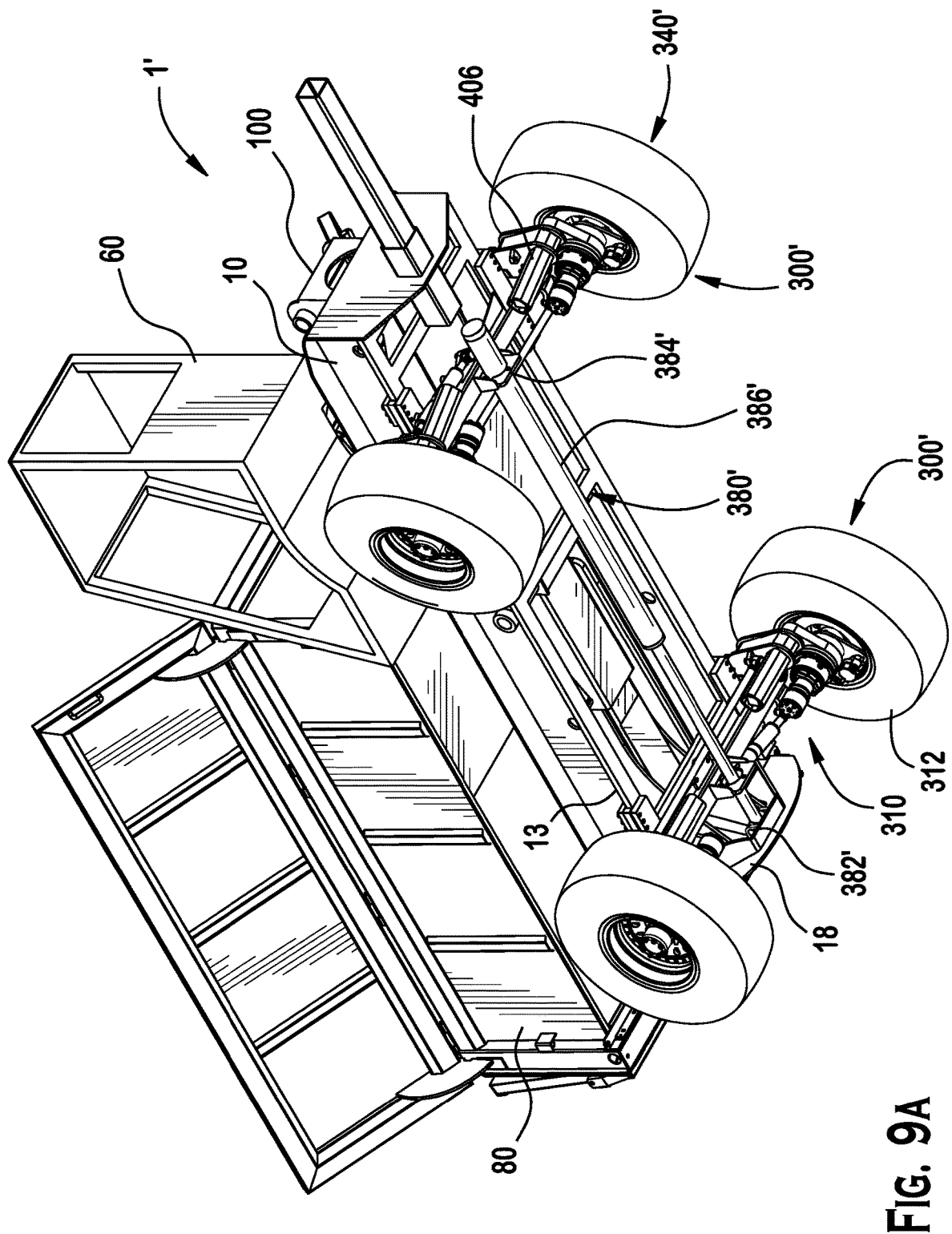

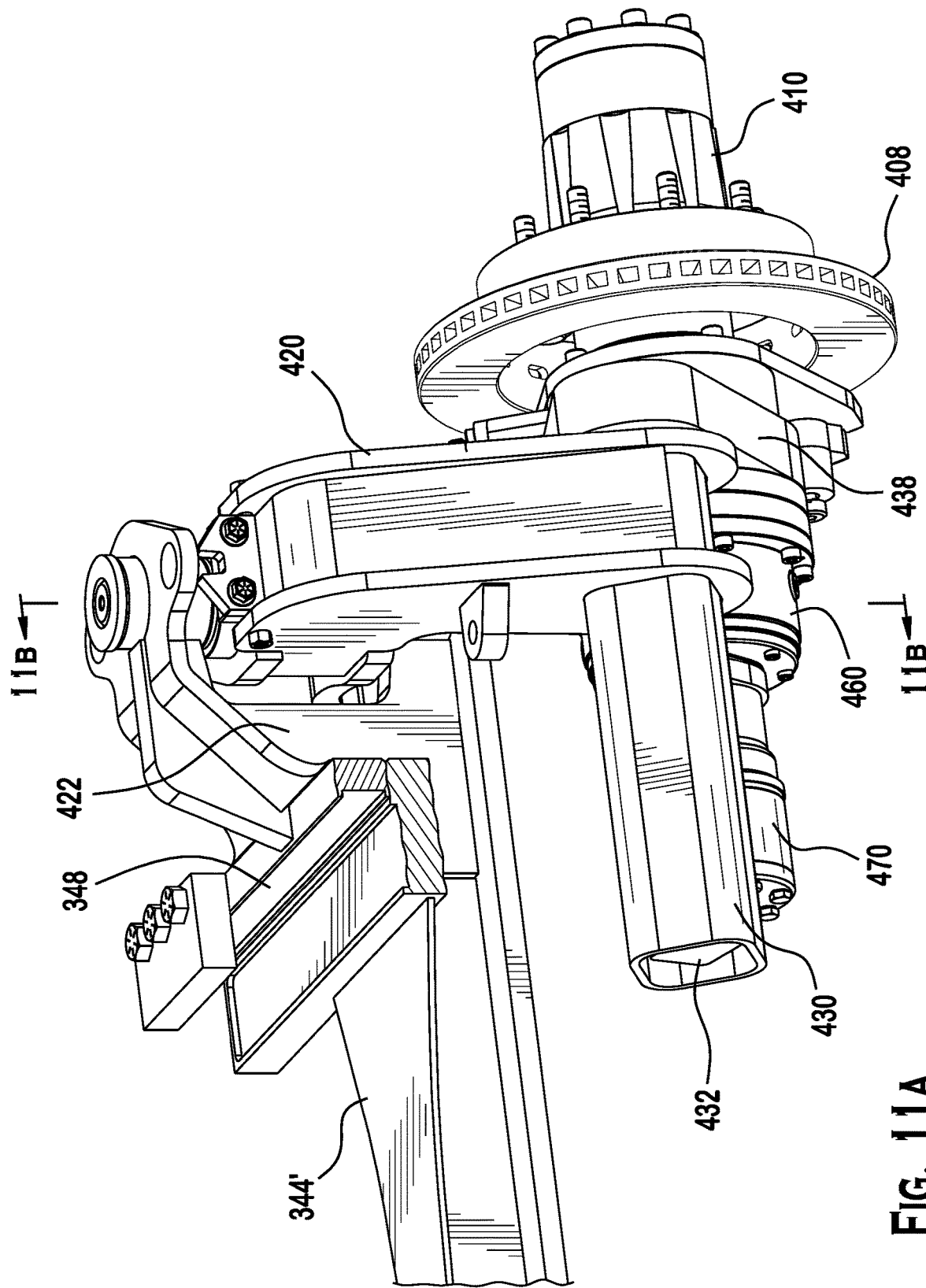

VEHICLE DRIVE SYSTEM FOR A SELF-PROPELLED TRAILER

CROSS-REFERENCE TO RELATED APPLICATION

This application is a continuation-in-part of Ser. No. 16/599,820 filed on Oct. 11, 2019, which claims the benefit of the filing date of Provisional Patent Application No. 62/744,901, filed on Oct. 12, 2018.

FIELD OF THE INVENTION

The invention relates to a drive system and, more particularly, to a drive system for a self-propelled trailer.

BACKGROUND

Workers often find that providing materials for replacement of a building roof is very time consuming, considering the task involves using different mechanical units or manual labor to lift building materials from a truck and position them on a roof. Furthermore, stripping old material from the building roof in order to put on a new roof is also time consuming and a dirty job. Generally, old material is thrown from the roof to the ground around the building and then workers manually pick up debris to deposit it into a disposal container. Even if the material can be thrown directly into a container there remain the problems of getting the disposal container in proximity to the roof and removal from the work site. The most common solution to the disposal problem is to move a dump truck adjacent to the building and to attempt to throw the material directly from the roof into the truck bin. Furthermore, the problem is not limited to roofing material. Any building remodeling generates significant construction trash, and the most convenient method of removing it from the building is to throw it out a window.

As a result, it is not always possible to move a large truck into a location adjacent to a building. Fences, lawns, and shrubs can be damaged by any size truck, especially a large transport truck.

There is a need for a vehicle having a drive system that facilitates independent movement around the typical landscaped yard surrounding a building and position a storage bin into an extended position near workers and that is study enough to handle large loads.

SUMMARY

In view of the foregoing, a vehicle drive system is provided and generally includes a hub assembly, a drive assembly and a clutch assembly. The hub assembly having wheel hub upon which a wheel assembly is secured. The drive assembly is configured to selectively transmit a motive force to cause the hub to turn. The drive assembly includes a motor with a rotatable motor output shaft, a transmission assembly connected to the motor and receiving in the rotatable motor output shaft into an input opening therein, and a driveshaft connected to an output from the transmission assembly. The clutch assembly connected to the hub assembly and engagebale to the driveshaft.

BRIEF DESCRIPTION OF THE DRAWINGS

The invention is explained in greater detail below with reference to embodiments and the appended drawings of which:

FIG. 9A is a bottom perspective view of another embodiment of the self-propelled tandem axle trailer according to the invention;

FIG. 11A is a close up, rear view of a suspension, drive and hub assembly of the self-propelled tandem axle trailer according to the invention;

DETAILED DESCRIPTION OF THE EMBODIMENT(S)

Figure 1:
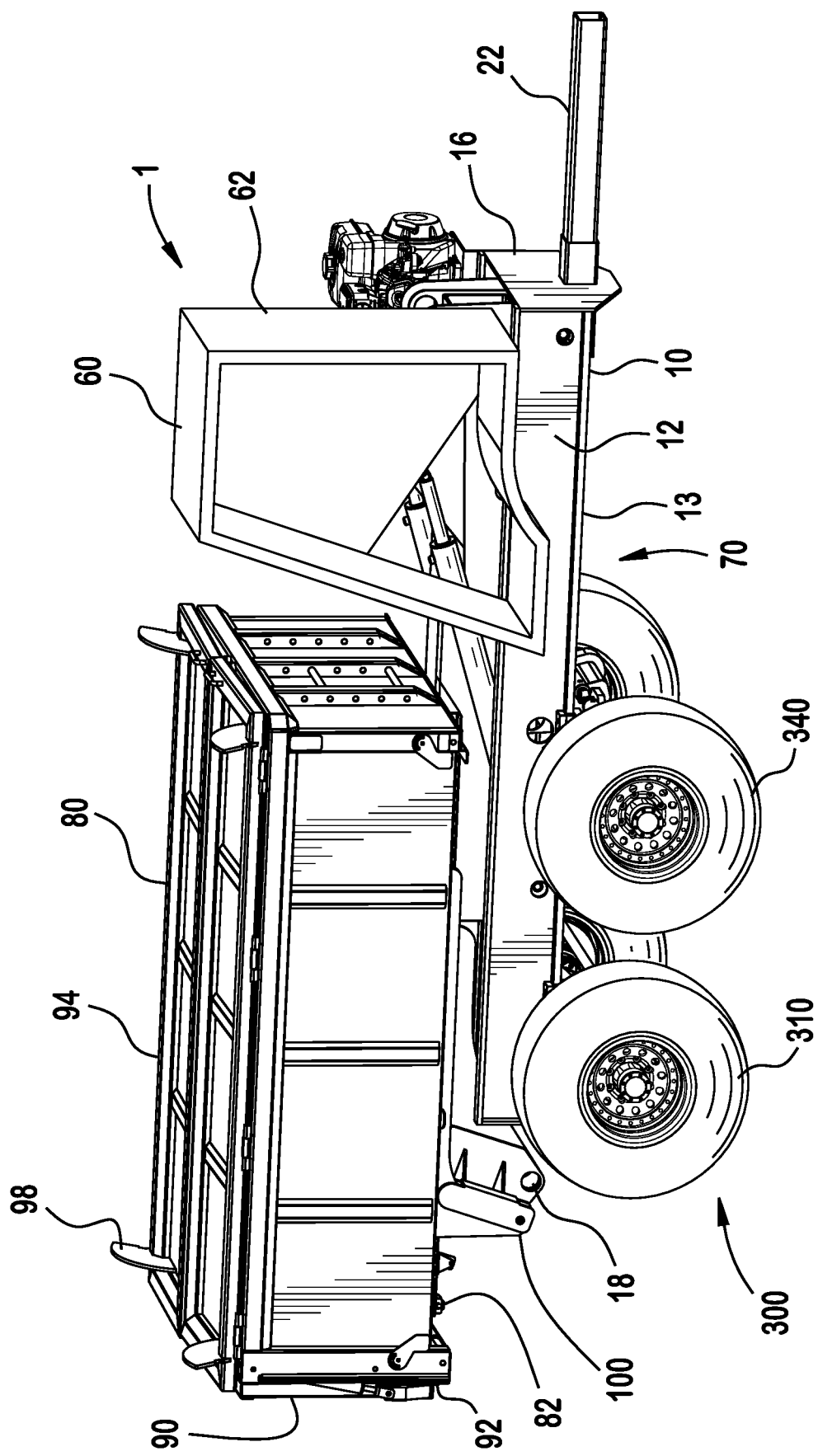
FIG. 1 is a front perspective view of a self-propelled tandem axle trailer according to the invention.

With respect to FIGS. 1-6, a trailer 1 according to the invention is shown and ready for towing by a power vehicle, such as a truck with a tow hitch. The trailer 1 generally includes the following major components: a frame 10, a control system 60, a storage bin 80, and an extension device 100, and a tandem wheel assembly 300.

Now with reference to FIGS. 1-4, the frame 10 will be discussed. In the shown embodiment, the frame 10 includes a plurality of support beams 12, a plurality of connecting beams 14, a front support 16, a rear support 18, a trailer connection section 22.

Figure 2:
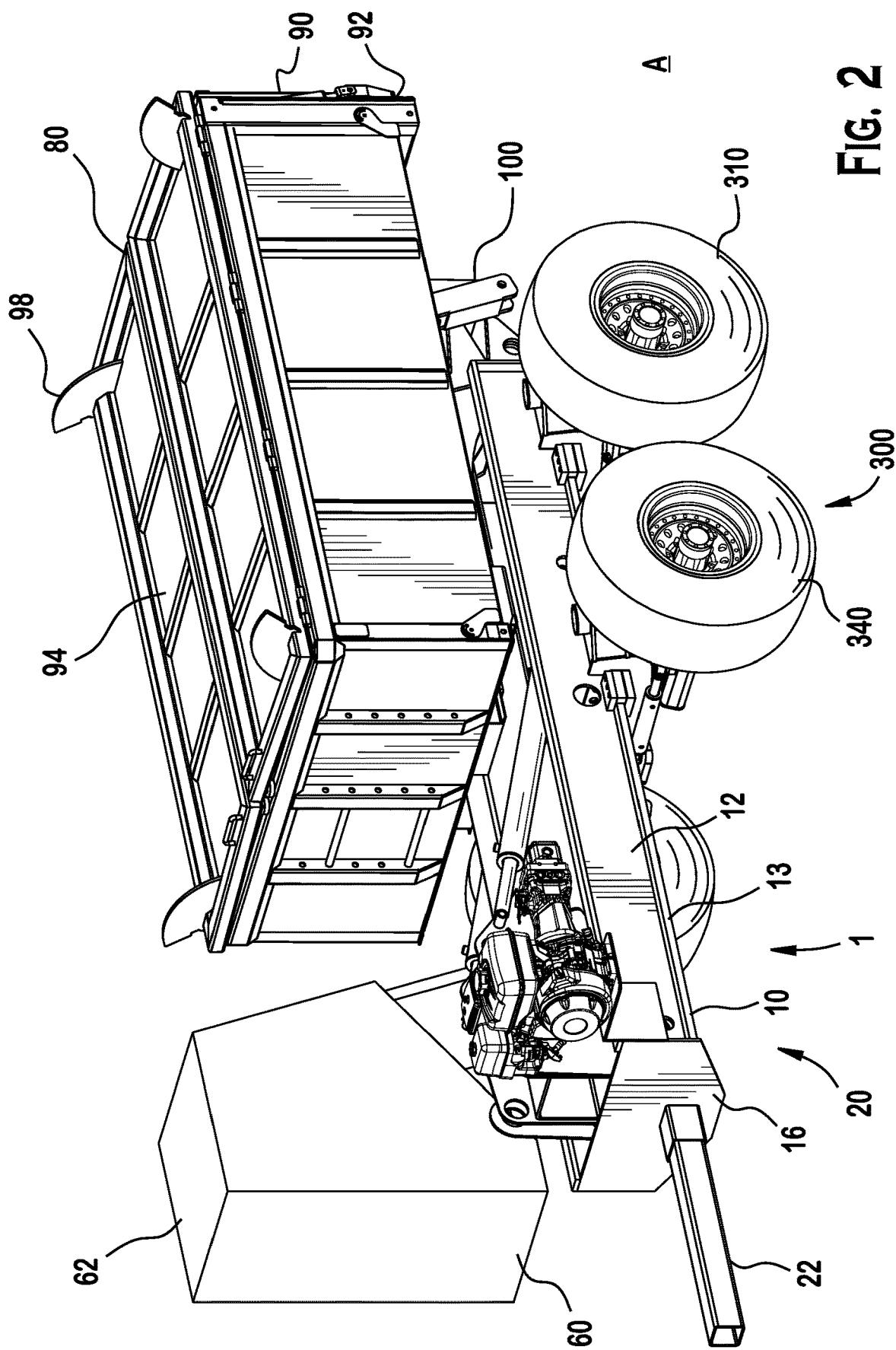
FIG. 2 is rear perspective view of the self-propelled tandem axle trailer of FIG. 1.
Figure 3:
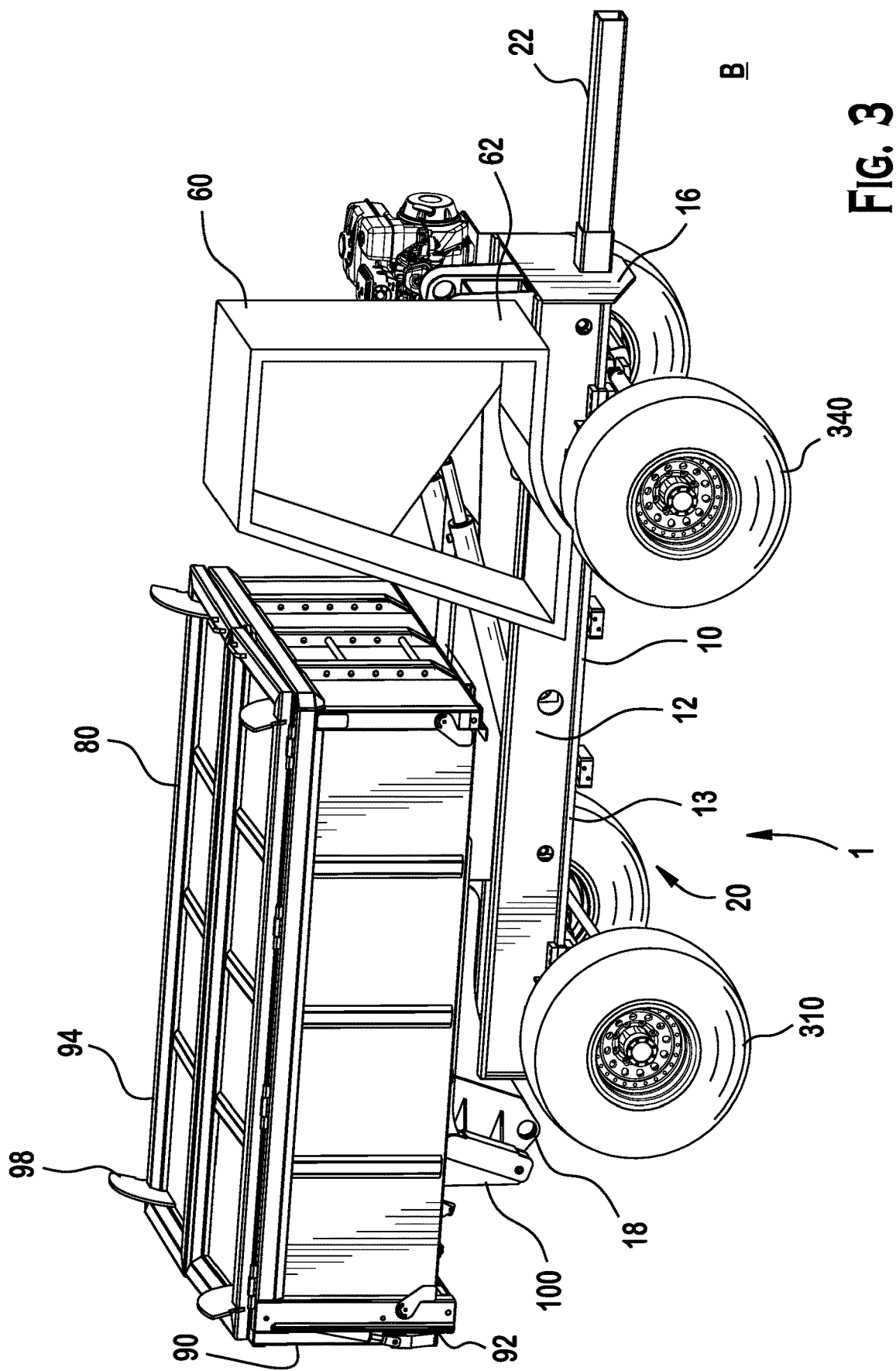
FIG. 3 is perspective view of a self-propelled tandem axle trailer according to the invention, showing extension of a front axle to a drivable position.
Figure 4:
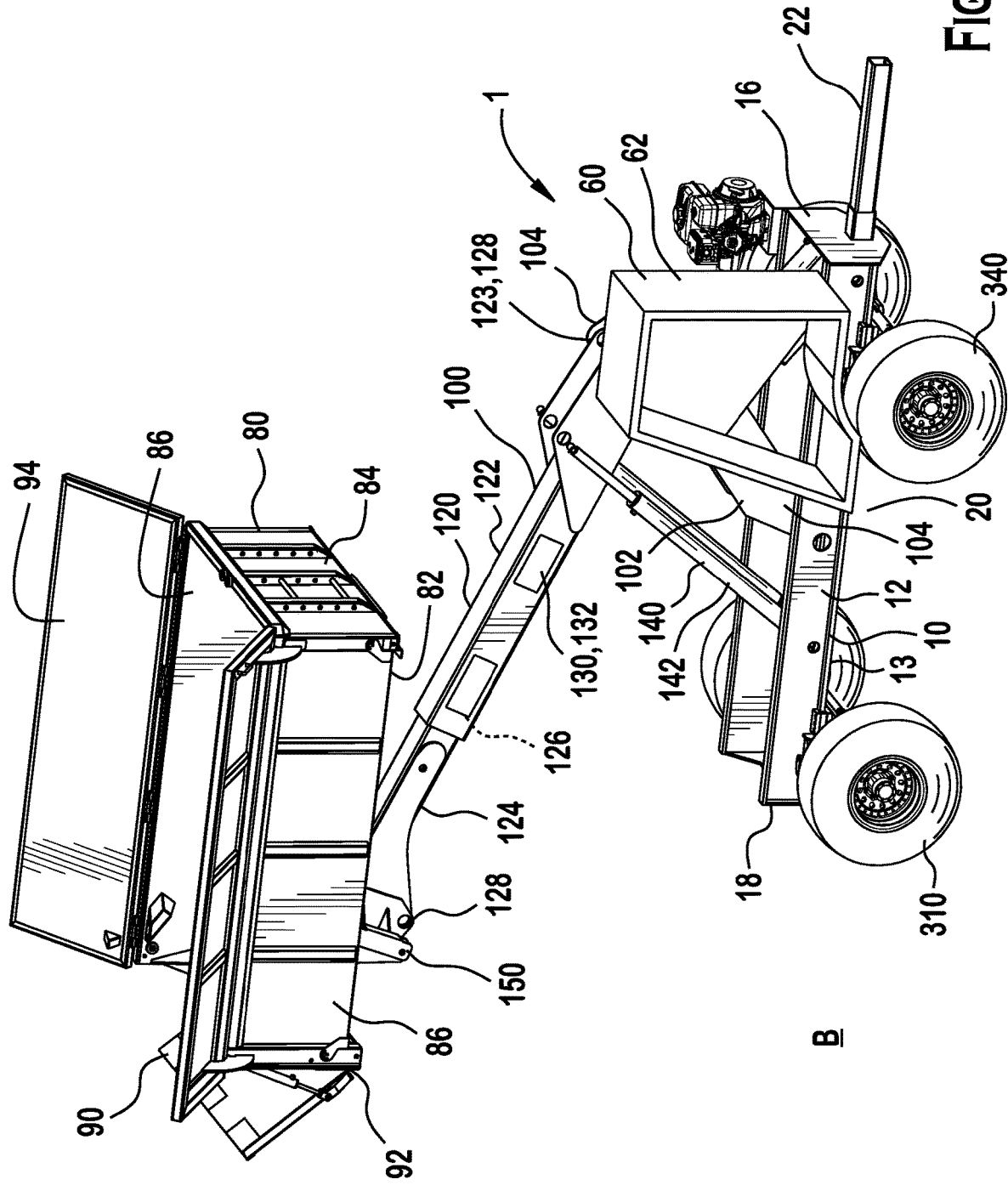
FIG. 4 is another perspective view of the trailer of FIG. 3, showing extension and inclination of a storage bin thereof.
Figure 5:
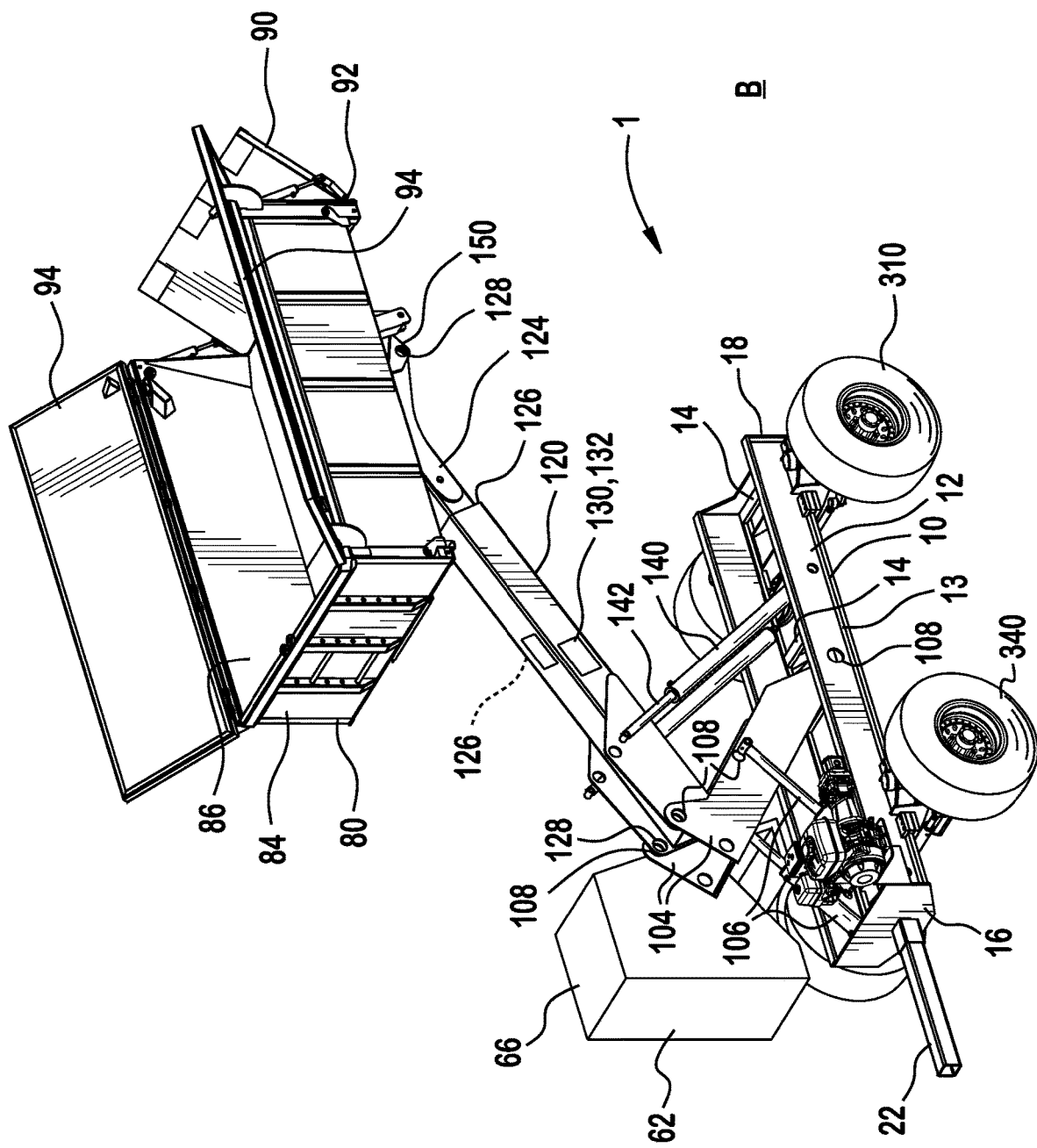
FIG. 5 is a front perspective view of the trailer of FIG. 3, showing further extension and inclination of the storage bin.
Figure 6:
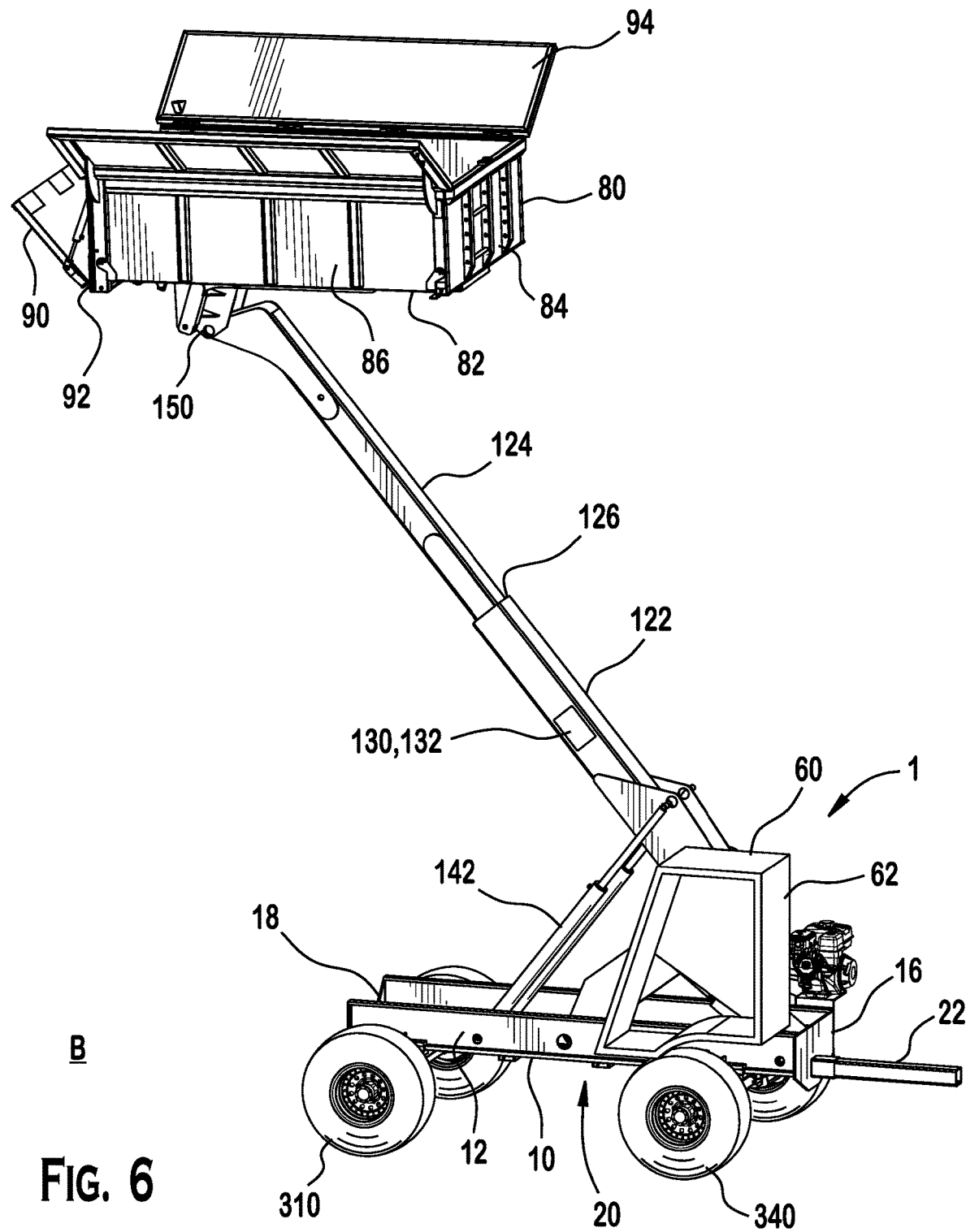
FIG. 6 is a rear perspective view of the trailer of FIG. 5.

As shown in FIGS. 2 and 3, each support beam 12 is an elongated metal support extending along a length of the frame 10, from a trailing end to a leading end thereof.

In the embodiment shown, each support beam 12 is I-shaped and includes a support rail 13 positioned on a lower end and running along a length thereof.

Each connection beam 14 runs substantially perpendicular and connecting to the plurality of support beams 12. The front support 16 is a plate like member connecting the support beams 12 at a front end thereof, while the rear support is another plat like member connecting the support beams 12 at an opposite end thereof. As assembled, the support beams 12, connection beams 14, front support 16, and rear support form a undercarriage chassis 20

As shown, in an exemplary embodiment of the invention, the trailer connection section 22 is a trailer hitch 22 positioned and connected to a leading end of the frame 10, and, in particular, the front support 16. The trailer hitch 22 includes a connector for connecting with a truck (i.e., ball mount; not shown).

According to the invention, the trailer 1 includes a tandem wheel assembly 300. In an exemplary embodiment of the invention, the tandem wheel assembly 300 is positioned under the undercarriage chassis 20 and generally includes a rear wheel assembly 310, a front wheel assembly 340, and an extension assembly 380.

Figure 8:
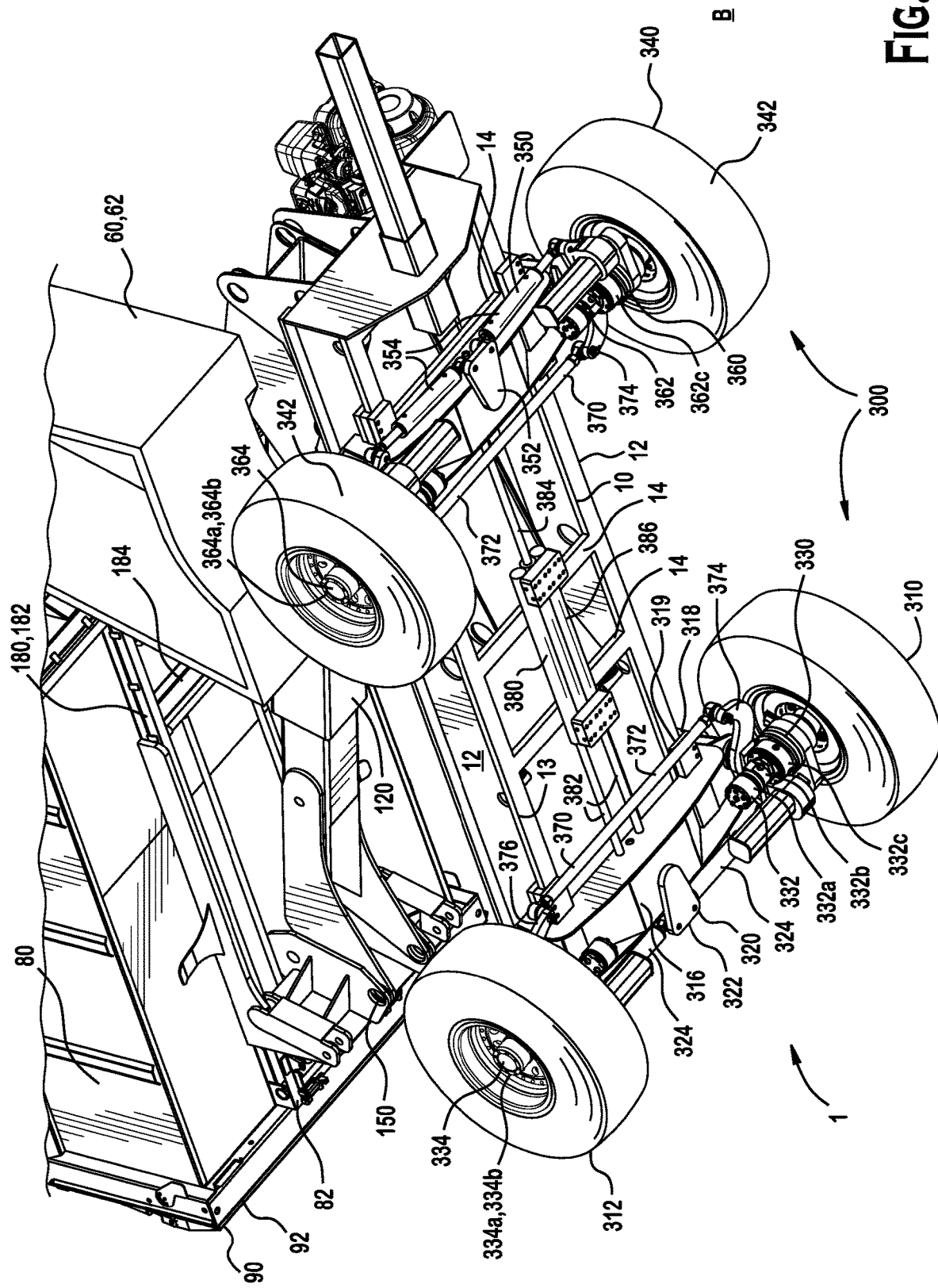
FIG. 8 is a bottom perspective view of the self-propelled tandem axle trailer according to the invention.

As shown in FIGS. 8, the rear wheel assembly 310 includes a pair of rear wheels 312, a rear wheel frame 314, a rear steering assembly 320, and a rear drive assembly 330.

In the embodiment shown, the rear wheel frame 314 includes a rear guide member 315 member having a body 316 and a pair of low friction guides 318 positioned at opposite side ends thereof. Each low friction guide 318 is a u-shaped member secured to the rear wheel frame 314 and is sized and shaped to correspond to receive the support rail 13. The low friction guide 318 includes low frictions pads 319 are bearing pads known in the art to provide a low friction coefficient between the rear wheel frame 314 and the support rail 13. In the shown embodiment, the low friction pads 319 line an inside surface of the low friction guide 318.

In the embodiment shown, the rear wheel assembly 310 includes steering capability using a rear steering assembly 320 according to the invention. However, one skilled in the art should appreciate that this rear wheels 312 may be non-steerable. As shown, the rear steering assembly includes a steering bracket 322, a pair of steering arms 324 connected to the steering bracket 322 and the pair of rear wheels 312.

As shown in FIG. 8, in an exemplary embodiment of the invention, the rear wheel assembly 310 includes a rear drive assembly 330 according to the invention. In an exemplary embodiment of the invention, the rear drive assembly 330 includes a hydraulic motor assembly 332 and a rotor assembly 334, and an engagement assembly 370 for each rear wheel 312.

In an embodiment of the invention, the hydraulic motor assembly 332 generally includes a motor 332a, a motor drive mechanism 332b, and a motor housing 332c. The motor 332a is connected to the control system 60 using hydraulic lines (not shown). The motor 332a is attached to the outside of the motor housing 332c. The motor drive mechanism 332b positioned in a motor housing 332c is engageable with the hydraulic motor 332a and moveable by the engagement assembly 370.

In an embodiment of the invention, the rotor assembly 334 includes a wheel hub 334a and a drive shaft 334b with a rotor drive mechanism (not shown) engageable with the motor drive mechanism 332b by the engagement assembly 370. The drive shaft 334b connected to the wheel hub 334a.

Many of the power system components are not shown for sake of complexity in the drawings, although a discussion is provided for purposes of enabling one skilled in the art to understand how the drive system is assembled and performed. One skilled in art should appreciate that other designs are possible. For instance, the rear drive assembly 330 may include other methods to move the rear wheels 312, including chains, belts, or a drive shaft and a transmission connected to a combustion or electric engine, so that trailer 1 can be moved around a work site under its own power.

Figure 7:
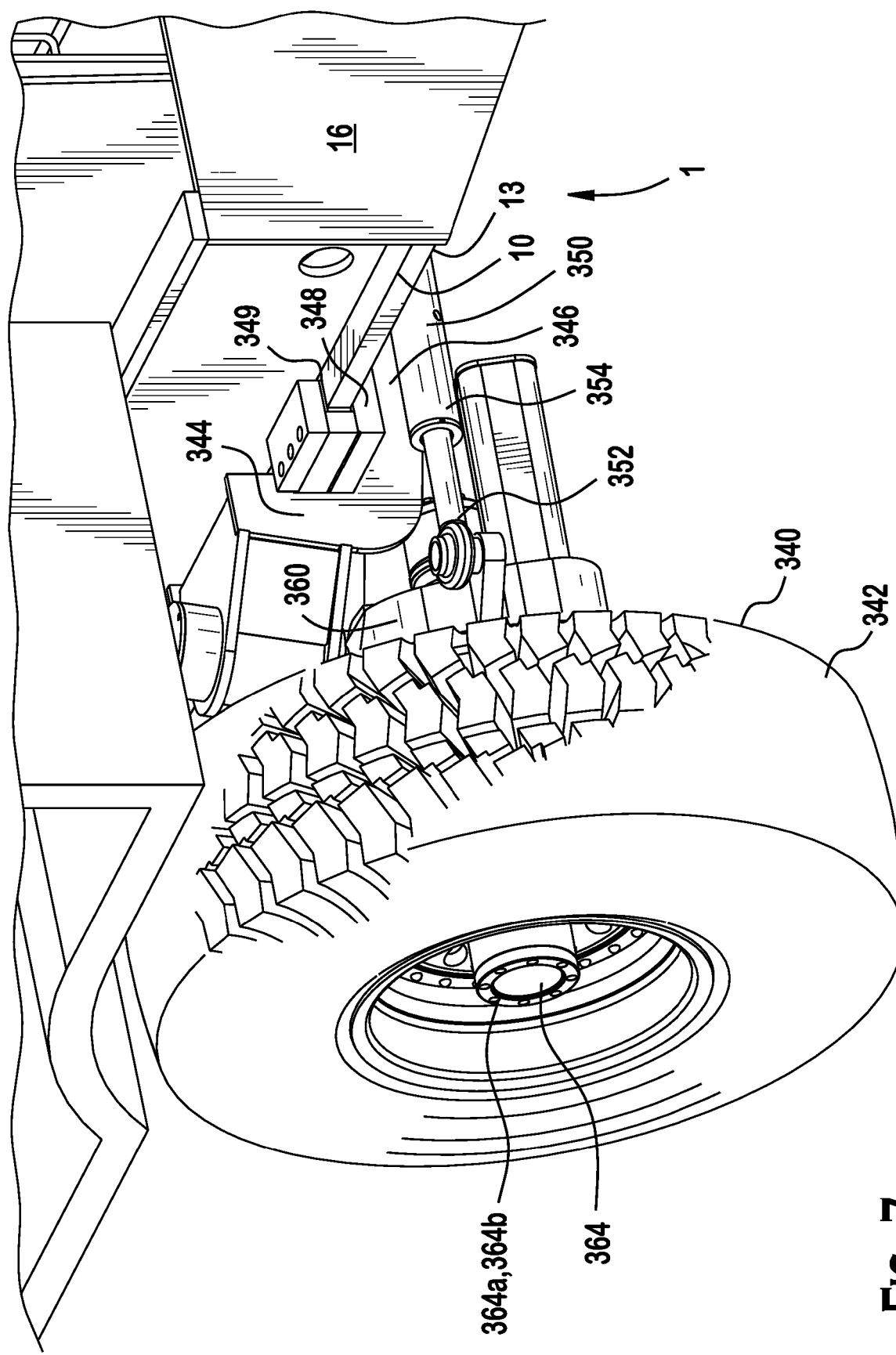
FIG. 7 is a close up view of a front wheel of the self-propelled tandem axle trailer according to the invention.

As shown in FIGS. 7 and 8, the front wheel assembly 340 includes a pair of front wheels 342, a front wheel frame 344, a front steering 350 assembly, and a front drive assembly 360.

In the embodiment shown, the front wheel frame 344 is u-shaped member having a body 346 and a pair of low friction guides 348 positioned at opposite side ends thereof. Each low friction guide 348 is a u-shaped member secured to the front wheel frame 344 and is sized and shaped to correspond to receive the support rail 13. The low friction guide 348 includes low frictions pads 349 that are bearing pads known in the art to provide a low friction coefficient between the front wheel frame 344 and the support rail 13. In the shown embodiment, the low friction pads 349 line an inside surface of the low friction guide 318.

In the embodiment shown, the front wheel assembly 340 includes steering capability using a front steering assembly 350 according to the invention. However, one skilled in the art should appreciate that this front wheels 342 may be non-steerable. As shown, the front steering assembly includes a steering bracket 352, a pair of steering arms 354 connected to the steering bracket 352 and the pair of front wheels 342.

As shown in FIG. 8, in an exemplary embodiment of the invention, the front wheel assembly 340 includes a front drive assembly 360 according to the invention. However, one skilled in the art should appreciate that these front wheels 342 may be non-driveable, without a drive system.

In an exemplary embodiment of the invention, the front drive assembly 360 generally includes a hydraulic motor assembly 362 and a rotor assembly 364, and an engagement assembly 370 for each front wheel 342.

In an embodiment of the invention, the motor assembly 362 generally includes a motor 362a, a motor drive mechanism 362b, and a motor housing 362c. The motor 362a is connected to the control system 60 using hydraulic lines (not shown). The motor 362a is attached to the outside of the motor housing 362c. The motor drive mechanism 362b positioned in a motor housing 362c is engageable with the hydraulic motor 362a and moveable by the engagement assembly 370.

In an embodiment of the invention, the rotor assembly 364 includes a wheel hub 364a and a drive shaft 364b with a rotor drive mechanism (not shown) engageable with the motor drive mechanism 362b by the engagement assembly 370. The drive shaft 364b connected to the wheel hub 364a.

Many of the power system components are not shown for sake of complexity in the drawings, although a discussion is provided for purposes of enabling one skilled in the art to understand how the drive system is assembled and performed. One skilled in art should appreciate that other designs are possible. For instance, the front drive assembly 360 may include other methods to move the front wheels 342, including chains, belts, or a drive shaft and a transmission connected to a combustion or electric engine, so that trailer 1 can be moved around a work site under its own power.

In the shown embodiment, the rear wheel assembly 310 and the front wheel assembly 340 includes an engagement assembly 370. As shown, each engagement assembly 370 generally includes a main shaft 372, a first lever assembly 374, and a second lever assembly 376. The main shaft 372 is an elongated cylindrical member and connected to the first lever assembly 374 and the second lever assembly 376 at opposite ends thereof. The first lever assembly 374 and the second lever assembly 376 are connected to opposite rear wheels 312 or front wheel 342, and engage and disengage the motor drive mechanism 332b, 362b, from the rotor drive mechanism (not shown) to rotate the wheel hub 334a, 364a.

In an exemplary embodiment of the invention, the extension assembly 380 generally includes a rear end connector 382, a moveable axle connector 384, and a moving component 386. The rear end connector 382 is connected to the rear wheel assembly 310, while the moveable axle connector 384 is connected to the front wheel assembly 340. The moving component 386 is a hydraulic actuator positioned and secure to the undercarriage chassis 20 in the shown embodiment. The moving component 386 is capable of extension and contraction. When connected to the front wheel assembly 340, the front wheels 342 can be positioned between the trailing position A (see FIGS. 1 and 2) and the self-propelled position B (see FIGS. 5-8).

Figure 9B:
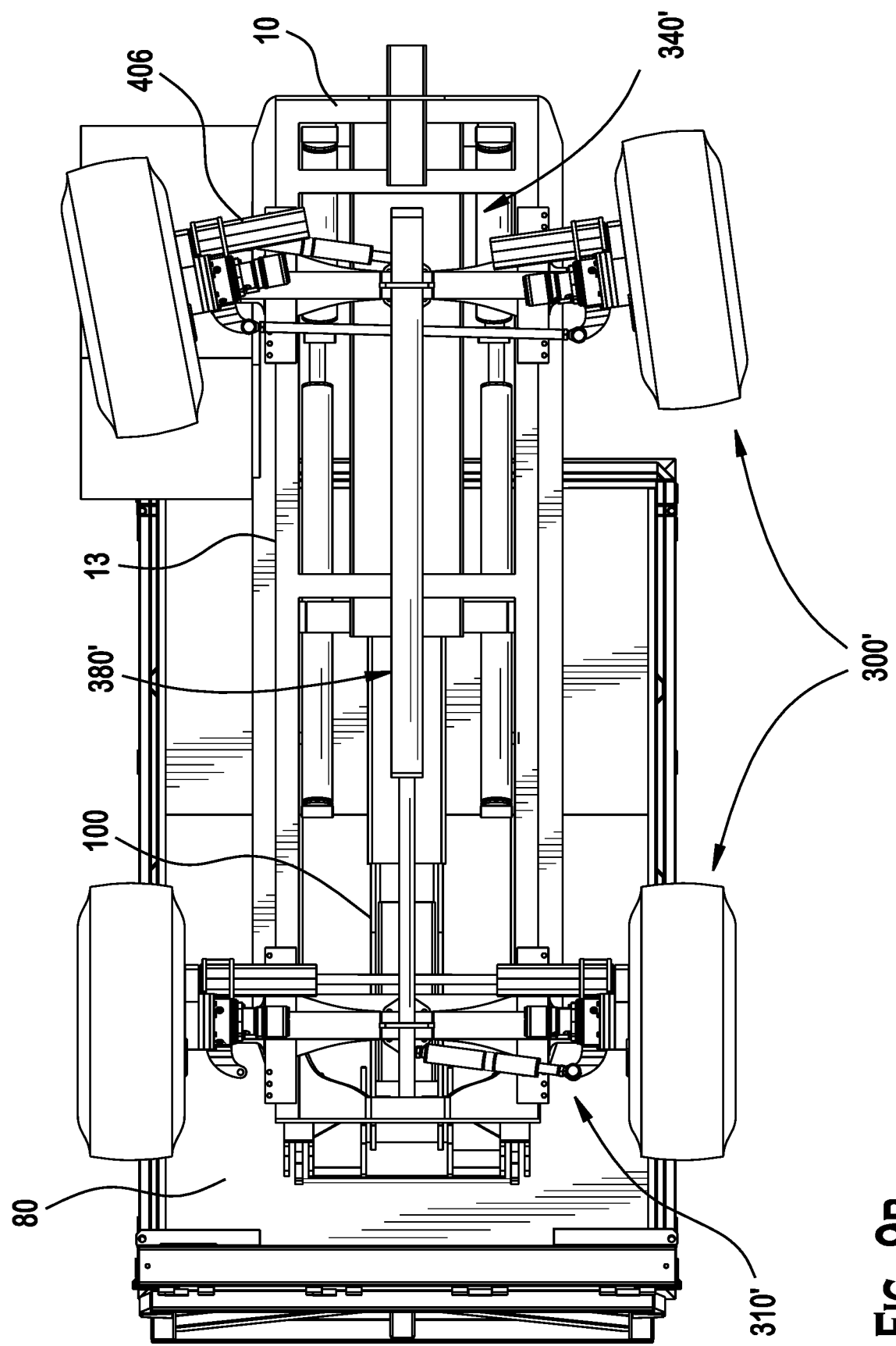
FIG. 9B is a bottom view of the self-propelled tandem axle trailer of FIG. 9A.

FIGS. 9A and 9B depict an alternate exemplary embodiment of the invention. The trailer 1' of FIGS. 9A and 9B generally includes the following major components: a frame 10, a control system 60, a storage bin 80, and an extension device 100, as discussed previously, and an alternate tandem wheel assembly 300'. Though not depicted in FIG. 9A or B, it is contemplated that the trailer 1' would beneficially include a source of power, similar to the example power source depicted in FIGS. 1-6, and 8, and may, in exemplary embodiments, be one or more of batteries and/or combustion engines. The power source may power or otherwise enable the powered movement and actions of the various features of the trailer described herein, including power for self-propelled transport, steering, braking, extension and/or retraction of the tandem wheel assembly, and movement of the storage bin, relative to the frame.

As shown in FIG. 9A, the alternate tandem wheel assembly 300' is positioned under the frame 10, and generally includes a rear wheel assembly 310', a front wheel assembly 340', and an extension assembly 380'. As described previously, the tandem wheel assembly provides for a front wheel assembly that is movably secured to the support rails 13, such that the front wheel assembly can selectively be positioned in the trailing position A (seen with reference to FIGS. 1 and 2), and the self-propelled position B, depicted in FIG. 9A, or any intervening position between them.

In any of the trailer embodiments, the front wheel assembly 340' may optionally be secured in either, or both, of the position A or B, by an actuatable locking mechanism, such as a manually or mechanically engaged locking mechanism, for example, locking pins, and the like, that secure the wheel assembly and frame elements so as to prevent unwanted movement relative to each other. Alternatively, the front wheel assembly may be maintained in the desired position through the actuation mechanism, for example, maintaining hydraulic pressure in a hydraulic actuator to secure the front wheel assembly in the desired position, such as when travelling, trailering, or parked and at rest.

FIG. 9A depicts the rear wheel assembly 310' having a pair of rear wheels 312, mounted to the hubs of the wheel assembly. Further aspects of a wheel assembly are discussed below. In an embodiment, the rear wheel assembly 310' may be fixedly secured in a position relative to the frame; for example, the rear wheel assembly may be immovably secured to the support rails 13. The rear wheel assembly may be affixed or secured using techniques known to those skilled in the art. For example, the rear wheel assembly may be mounted to the frame 10 or support rails 13 through the use of one or more fasteners, including for example, mounting posts, bolts and/or nuts, to secure the wheel assembly to the support rails or other frame portion; or alternatively, a portion of the rear wheel assembly may be welded to the support rails 13 or other portion of the frame 10.

Figure 10:
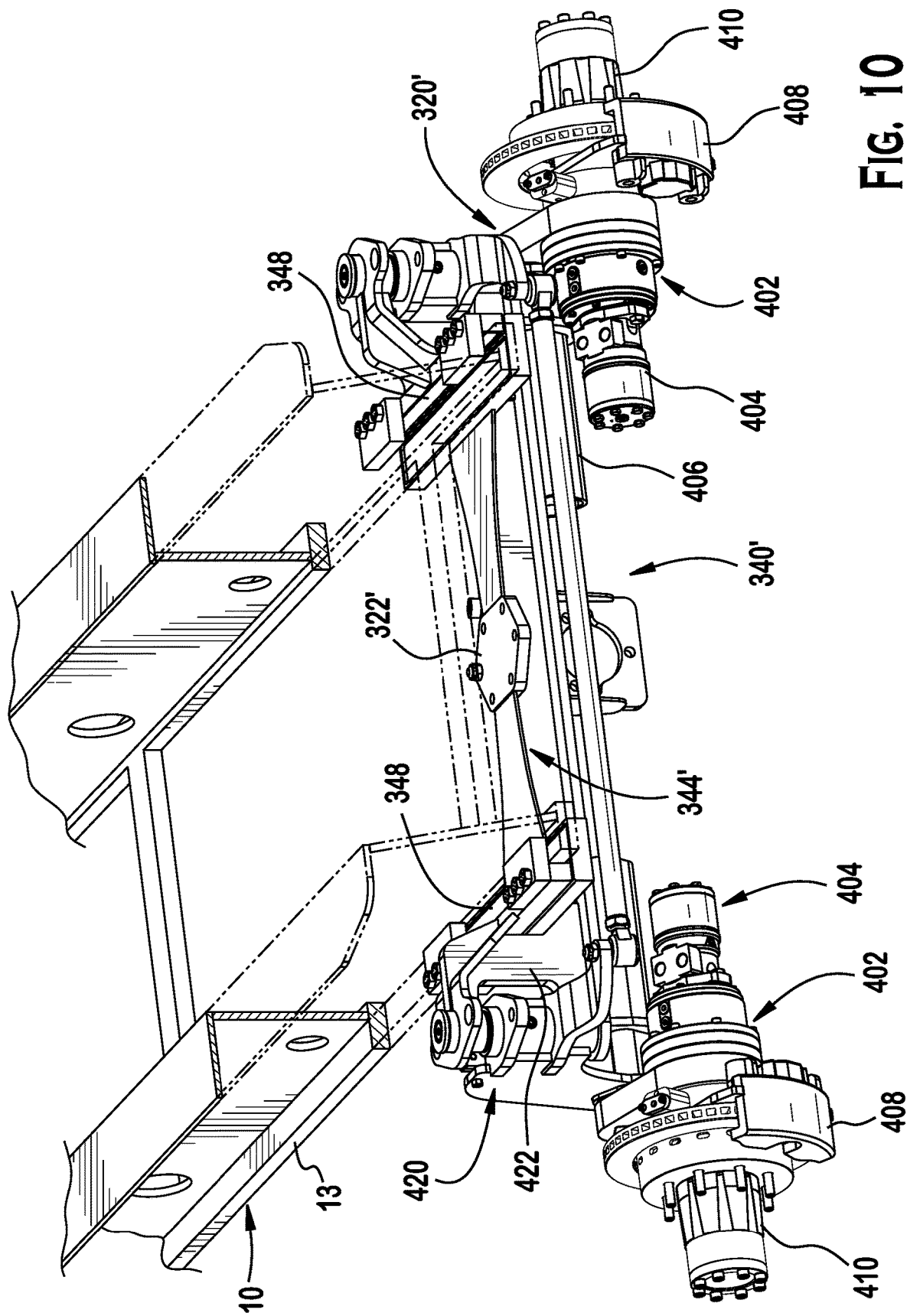
FIG. 10 is a perspective front partial view of an alternative embodiment of a front wheel assembly of the self-propelled tandem axle trailer according to the invention.

Also depicted in FIG. 9A is a front wheel assembly 340', having a pair of wheels 342, mounted on hubs of the front wheel assembly. In an embodiment, the front wheel assembly is movably mounted upon the frame 10 of the trailer; for example, by the use one or more u-shaped members slidably mounted on the front wheel frame, where the u-shaped member is sized and shaped to receive at least a portion of the support rail 13 of the frame, as depicted in FIGS. 9 and 10. The u-shaped member may be provided with low friction guide elements 348, including low friction pads 349 that serve as bearing pads known in the art to provide a low friction coefficient between the front wheel frame 344' and the support rail 13. In this manner, the front wheel assembly is movably secured to the frame in a manner that allows the wheel assembly to slide upon the frame support rails, and be alternately positioned in a trailer position A (depicted in FIG. 1), and the self-propelled position B as depicted in FIG. 9, or any point in between. As can be seen in the exemplary embodiment of FIG. 10, the front wheel assembly 340' is provided with u-shaped members slidably mounted on separate, parallel support rails 13 on the frame 10, and are positioned such that the u-shaped members prevent twisting movement of the front wheel assembly, relative to the frame, as the spacing provided between the inside dimensions of the opposing u-shaped members is substantially the same, or nearly the same, as the maximum width dimension of the support rails 13.

In an exemplary embodiment of the invention, as depicted in FIG. 9A, the extension assembly 380 generally includes a fixed end connector 382' that may be affixed to the frame at or near the rear support plate 18, though it is contemplated that alternatively, the connector 382' may be secured to the rear wheel assembly, which is itself fixed relative to the frame. The extension assembly 380 further provides a moveable axle connector 384', and a moving component 386'. The fixed end connector 382', as depicted in FIG. 9A may be directed through a bracket opening on the rear wheel assembly 310', and affixed to the rear support plate 18 of the frame 10. The fixed end connector 382' may alternatively be secured to the frame 10 at any point rearward of the front axle when in trailering position A of FIG. 1, so as the extension assembly is extended, the forward axle assembly is urged away from the fixation point on the frame. Though not shown, it is contemplated that the extension assembly may be configured in the reverse orientation (not depicted), where an extension assembly is alternatively secured to the frame at a mounting point forward of the front axle when in position B of FIG. 3, where extension of the extension assembly urges the front axle rearward into position A for trailering, and retraction of the extension assembly urges the front axle to position B for self-propelled movement of the trailer.

In an embodiment, as depicted in FIG. 9A, the fixed end connector 382' near the rear of the trailer may be the end portion of a linear actuator of the extension assembly 380', which may fit into a bracket and secured in place against the rear support plate 18 of the frame 10. The extension assembly 380' further provides for a moveable axle connector 384' on the front wheel assembly 340'. In an embodiment, the front wheel assembly 340' may have a bracket that secures to a portion of the linear actuator of the extension assembly 380' and serves as the moveable axle connector 384', as depicted in FIG. 9A. The moving component 386' may be any suitable form of linear actuator, for example, a hydraulic actuator positioned and secured to the undercarriage chassis 20, or frame 10'. The moving component 386' is capable of extension and contraction. In an embodiment, the moving component 386' is a double acting hydraulic cylinder. In an embodiment, the front wheel assembly 340' is secured to a portion of the cylinder barrel of the hydraulic cylinder, and the piston rod is secured to the rear of the frame. It is contemplated that where the moving component is a hydraulic cylinder, the positioning of the cylinder components may be mounted in reverse, with the piston rod affixed to the front wheel assembly, and the cylinder barrel secured to frame 10 closer to the rear of the trailer 1', or alternatively, directly connected to the rear wheel assembly 310'. It is contemplated, that in any mounting configuration where the linear actuator is connected to the front wheel assembly 340', the front wheel assembly 340' can selectively be positioned between the trailing position A (see FIGS. 1 and 2) and the self-propelled position B (see FIGS. 9A and B), by the action of the linear actuator.

Figure 13A:
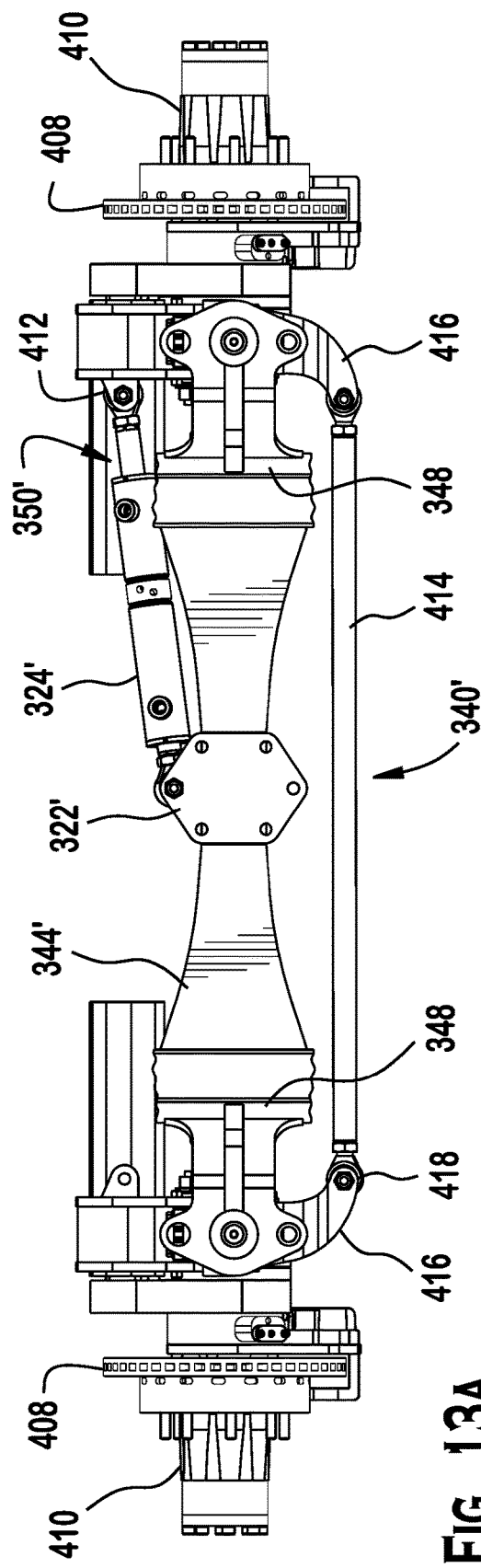
FIG. 13A is a top view of an alternative embodiment of a wheel assembly of the self-propelled tandem axle trailer according to the invention.
Figure 13B:
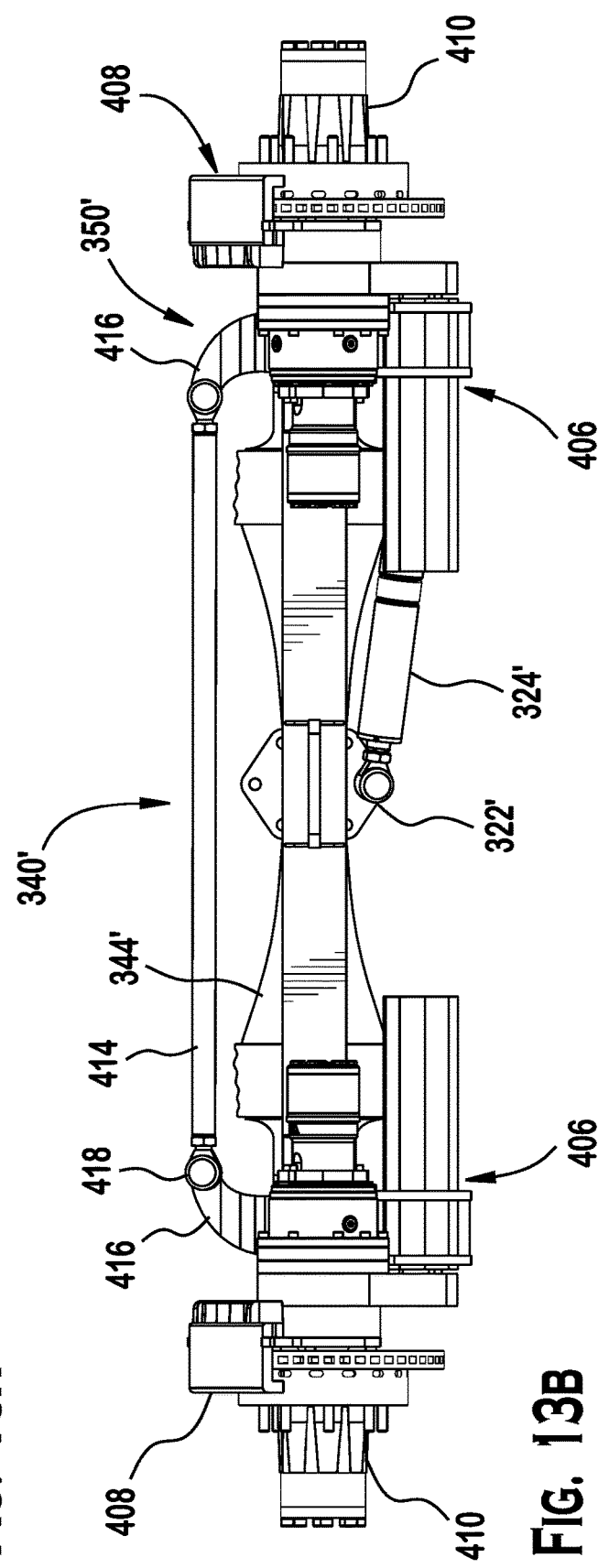
FIG. 13B is a bottom view of an alternative embodiment of a wheel assembly of the self-propelled tandem axle trailer according to the invention.

Details of the front wheel assembly 340' and rear wheel assembly 310' will now be discussed with reference to FIGS. 10 and 13A and B. For simplicity, the front wheel assembly 340' will be described, though applicable to the features of the rear wheel assembly 310' as well. An isolated front wheel assembly 340' is depicted in FIG. 10 in front perspective view. FIG. 13A presents a top view of the isolated wheel assembly, with the u-shaped brackets removed for clarity. FIG. 13B presents a bottom view of the isolated wheel assembly. It is anticipated that the depicted wheel assembly in FIGS. 10 and 13 may be deployed as one or both of the front wheel assembly or rear wheel assembly.

For simplicity, FIG. 10 will be described in the context of being a front wheel assembly 340', though applicable to either front or rear wheel assembly. With reference to FIG. 10, the front wheel assembly 340' as shown may be provided with a wheel assembly frame 344', a steering assembly 350', and a pair of hub assemblies 402.

Each hub assembly 402 includes a drive assembly 404, a suspension assembly 406, brake assembly 408, and hub 410 upon which a wheel is to be mounted. The front wheel assembly 340' of FIG. 10 may provide steering capability, motive and braking force to the trailer 1', as well as serving as a suspension, to isolate or minimize the effects of irregular surface features from the frame while the trailer is in motion. The front wheel assembly 340' of FIGS. 10, 13A and 13B however features marked differences from those wheel assemblies described previously; for example, each wheel assembly is provided with a single steering actuator, rather than two steering arms as previously described, resulting in a simpler, more cost effective design, where each wheel of the wheel assembly is maintained at a consistent angle, relative to the other wheel of the wheel assembly through the use of a mechanical linkage, such as a tie rod, extended between each hub assembly to ensure each hub assembly's steering angle consistent with the other.

As can be seen with reference to FIGS. 10 and 13A and B, exemplary front wheel assembly 340' in the depicted embodiment may include a pair of hubs configured to accept the mounting of wheels thereupon, with the wheels removed for clarity, a drive assembly, a brake assembly 408, a wheel assembly frame, a steering assembly, and suspension assembly. The wheel assembly of FIGS. 10 and 13A,B may be deployed as either, or both, of the front and rear wheel assemblies. It is contemplated that one of the wheel assembly embodiment depicted in FIG. 10 may be combined with a different embodiment of a wheel assembly, for example, the wheel assembly described previously with reference to FIG. 8.

In an embodiment, the wheel assembly frame 344 may provide support for mounting the other wheel assembly components from, and may be, for example, a truss or beam extended between the aforementioned u-shaped guide elements 348 configured to slide upon the frame rails 13.

The wheel assembly embodiment 340', as can be seen with reference to FIGS. 13A and 13B provides a steering capability through the action of a steering assembly 350' according to the invention. As depicted, the steering assembly 350' includes a steering bracket 322' which may be affixed to, or otherwise be made as part of the wheel assembly frame, a steering arm 324' (depicted in FIG. 13) extended between the steering bracket 322' and a steering arm mount 412 on a primary hub assembly. The steering assembly further comprises a tie rod 414 extended between steering knuckles 416 on each of the hub assemblies, which may be secured via a balljoint to allow for suspension movement.

As was noted previously, either or both of the front and rear wheel assemblies may independently provide steering capabilities to the trailer 1'. It is contemplated that the trailer 1' of FIG. 9A may selectively employ rear wheel steering, front wheel steering, or 4-wheel steering. It is contemplated that in order to minimize the turning radius, the extension assembly may be adjusted to be less than fully extended (so that the front wheel assembly is at a point between position A and position B, in order to shorten the wheelbase by moving the front wheel assembly in a direction towards the middle of the trailer, and thereby reduce the turning radius of the trailer, especially when employing round steer mode of four wheel steering. In this circumstance, the center of gravity for the trailer should remain within the dimensions defined by the axles, so as to avoid disrupting the balance of the trailer.

Each hub assembly for each of the wheel assemblies for the trailer 1' may have a brake assembly 408 including a brake caliper and brake rotor, as can be seen with reference to FIG. 10, by which the rotation of the wheels on the wheel assembly may be selectively slowed, or stopped from rotation. The brake assembly 408 may be actuated hydraulically, electrically, pneumatically, or mechanically. It is contemplated that any of the brake assemblies may be actuated independently, so as to slow or prevent the rotation of any single wheel, or alternatively, the brake assemblies may be actuated in pairs (fronts or rears) together, or further, the brake assemblies may be actuated all together, so as to provide four wheel braking, or prevent rotation of all four wheels simultaneously. It is contemplated that one or more of the brake assemblies may be actuated to secure the trailer 1' in a desired position, acting as a parking brake. In an alternative embodiment, it is contemplated that alternative braking solutions are possible, using, for example, drum brakes as are well understood, or alternatively, using a hydraulic drive system (discussed below), which may provide braking force for the trailer, whether as a supplement to the disk brake system previously described, or as a replacement, such that the hydraulic motor may function as the brake system for the trailer, obviating the need for a disk and caliper brake system, where the hydraulic motor system is employed to provide fluid resistance to the rotation of the wheel and hub, thereby providing braking or locking of the wheel and hub from rotation.

Figure 11B:
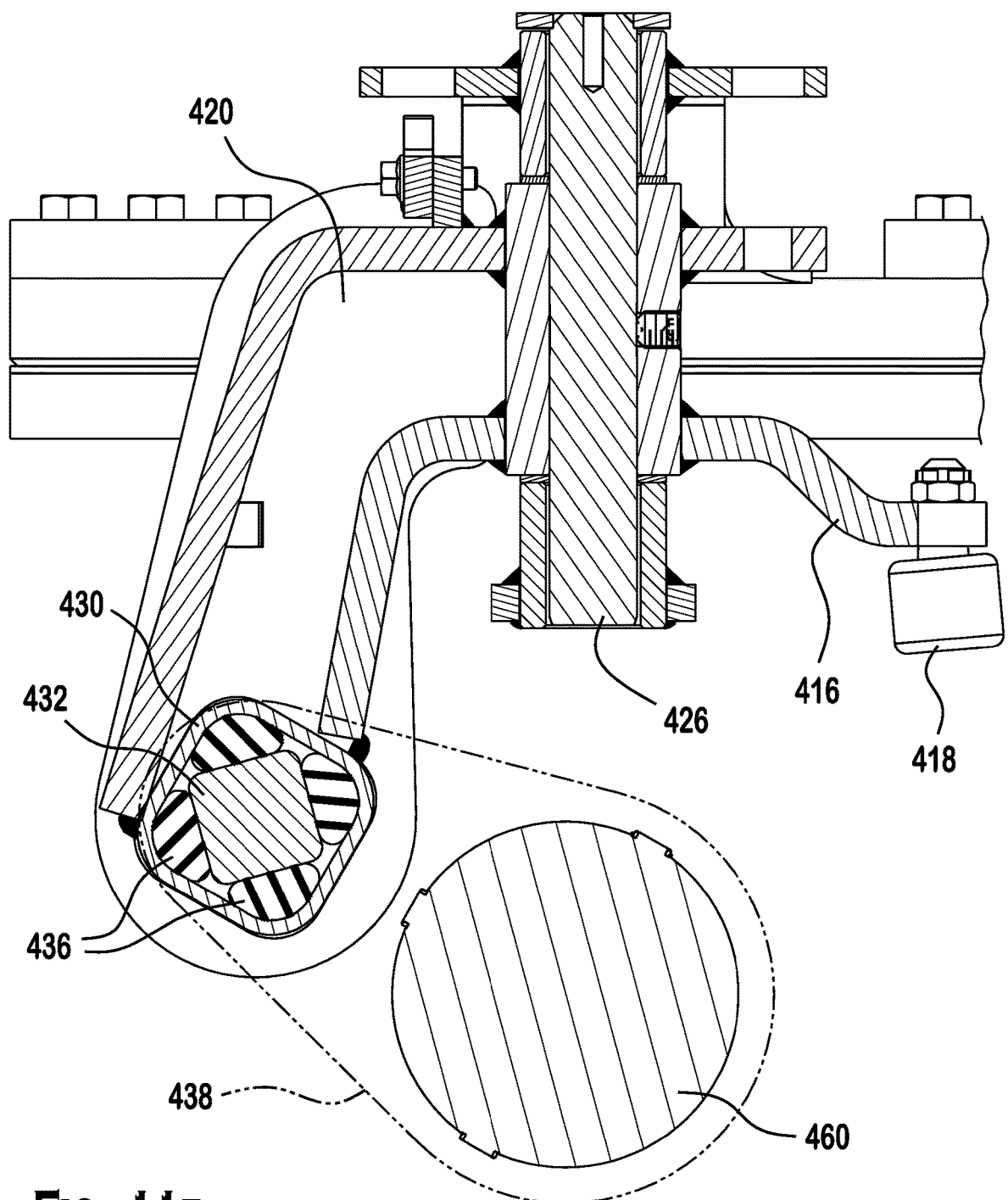
FIG. 11B is cross-section view of the suspension components of FIG. 11A.

Each of the hub assemblies may have a suspension assembly, such as a torsion suspension depicted in FIGS. 11A and B, that allows the independent movement of the wheel hub, relative to the wheel assembly frame, and the trailer it is affixed to, as the trailer traverses uneven ground.

Figure 14:
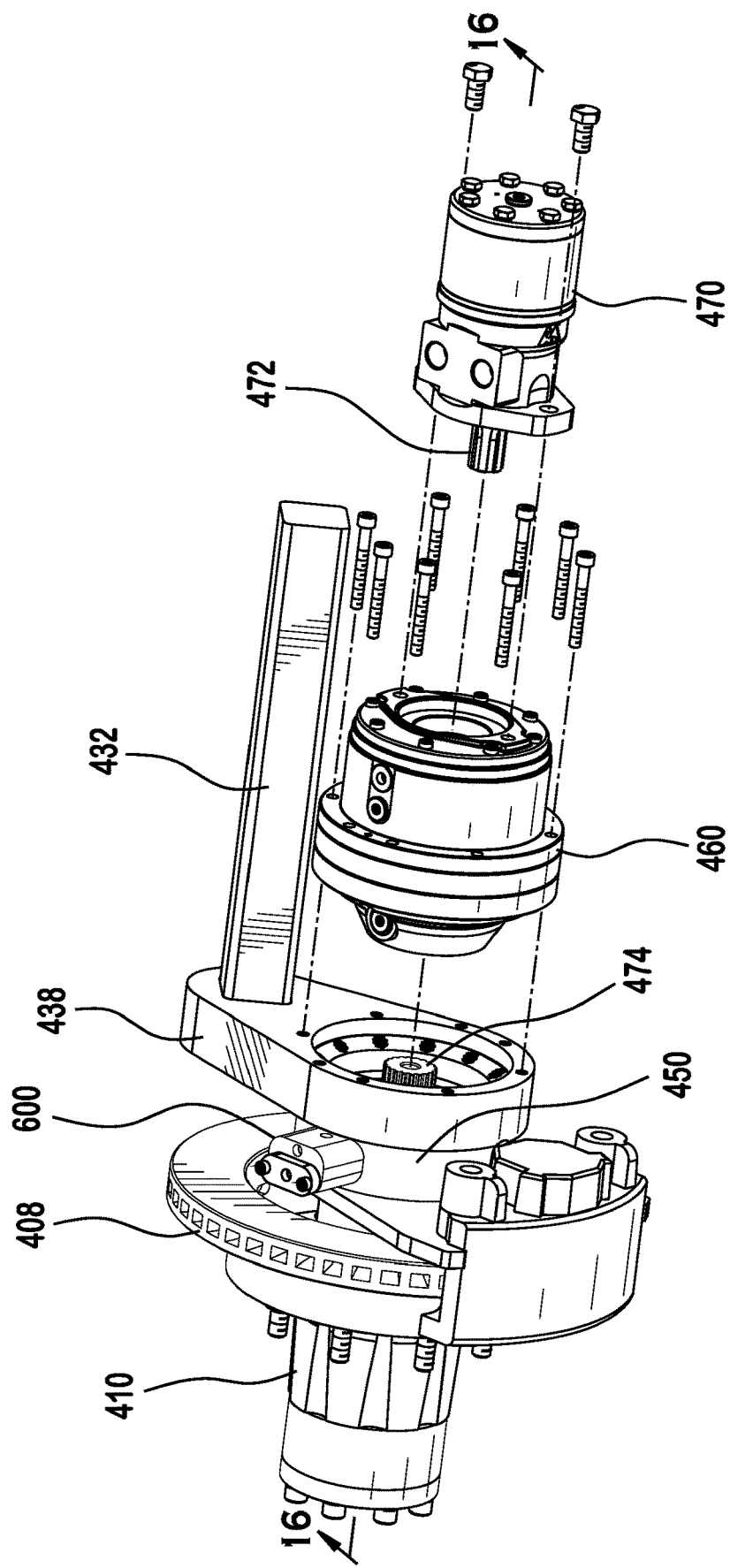
FIG. 14 is a partially exploded view of components of the wheel hub assembly depicting the motor, transmission, torsion arm, brake assembly and hub.

In an exemplary embodiment, and with reference to FIG. 14, each of the hub assemblies of the trailer may include a drive assembly that is configured to selectively transmit a motive force through the drive assembly to cause the hub 410, and thus a wheel mounted upon the hub to turn, thereby propelling the trailer 1'. As can be seen with reference to the partially exploded view provided by FIG. 14, a motor 470 may be provided, which may be a hydraulic motor as depicted, though it is contemplated that the motor may instead be any suitable motor, including electric or pneumatic, which when actuated will result in the rotation of the motor output shaft 472 in a selectable direction. In an embodiment, the drive and direction of rotation of the motor 470 for each of the hub assemblies are independently, selectively reversible, so as to provide adequate maneuverability to the trailer 1' and minimize the turning radius. The rotatable motor output shaft 472 is directed into an input opening in a transmission housing 460, which may contain a gear reduction system, for example, a planetary gear set which serves to increase the torque output from the motor, while reducing speed of rotation. The output from the transmission housing 460 is directed to a flanged driveshaft 474, as will be discussed.

Figure 12A:
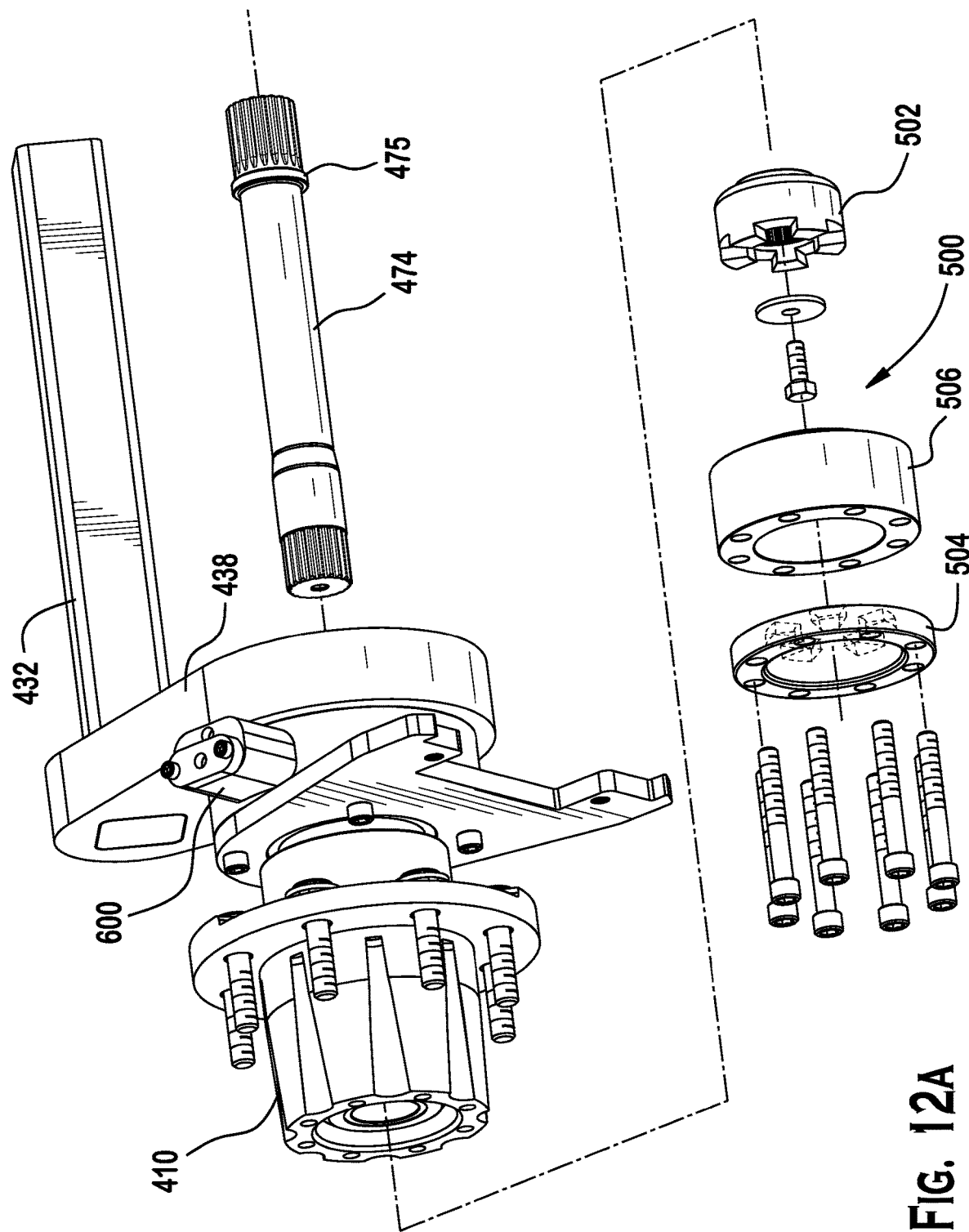
FIG. 12A is a partially exploded view of components of the drive assembly and hub assembly, including flanged driveshaft, clutch assembly, locking mechanism, and hub.
Figure 12B:
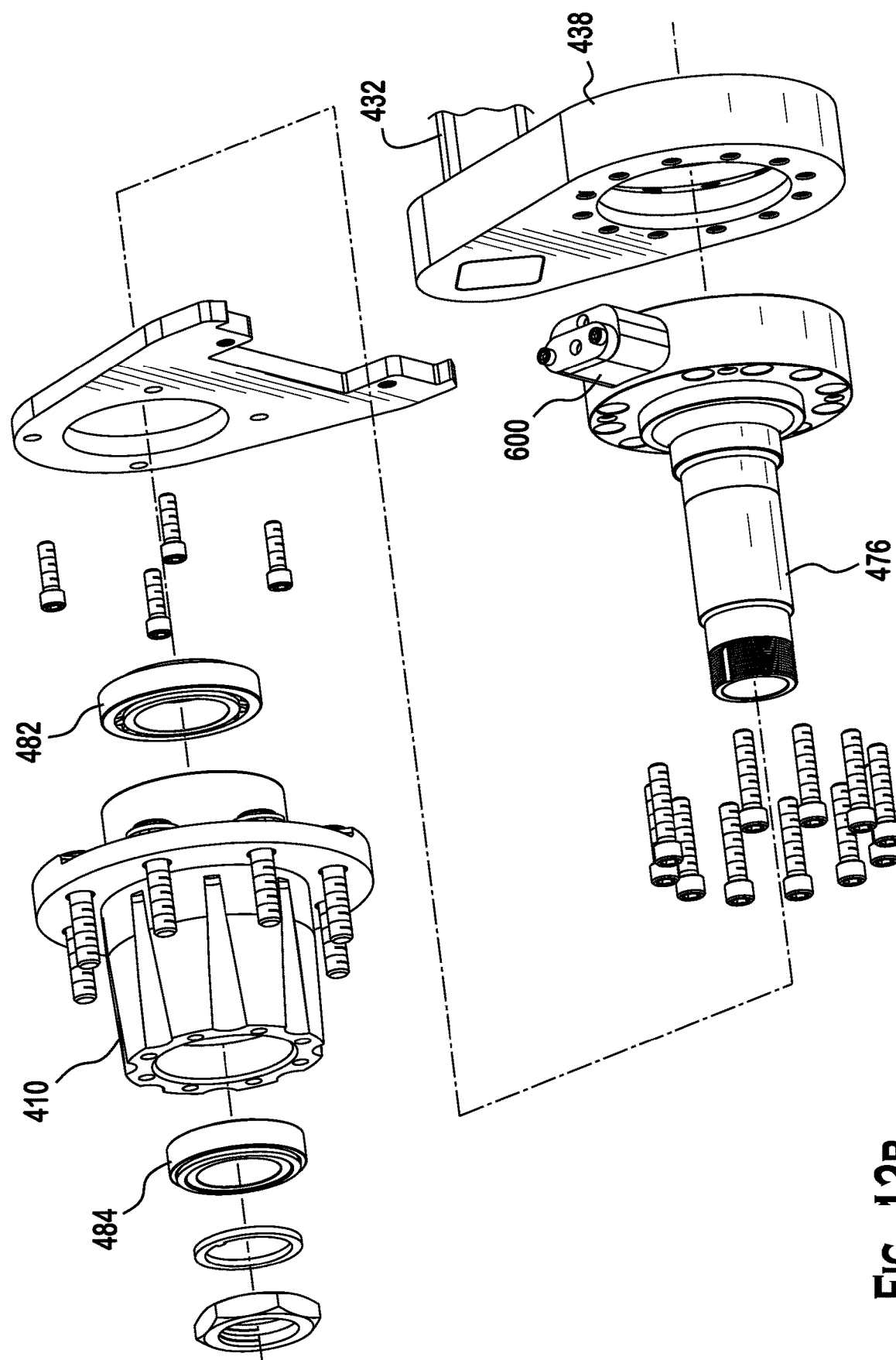
FIG. 12B is a partially exploded view of components of the drive assembly and hub assembly, including a bell housing, hub, and torsion arm.

As shown in FIG. 12A, the wheel assembly may be provided with a selectively engageable clutch assembly 500, providing a mechanism allowing each wheel of a wheel assembly to be driven by the motor, or to allow the hub/wheel to free-wheel independently of any rotation of the driveshaft. While the clutch is engaged, motive forces provided by the motor 470 are directed through the transmission 460, if any, and then by the driveshaft 474, whereby the motive forces may be passed through the clutch mechanism 500 to cause the rotation of the hub assembly upon which the wheel is mounted, thereby driving the wheel. While the clutch 500 is disengaged, the wheel and hub assembly may spin freely, independent of the driveshaft 474 and motor 470, as may be required while the trailer 1' is being towed by a powered vehicle between locations. The clutch mechanism 500 may be of any suitable type for selectively transmitting torque from the motor to the wheel, as is understood by those skilled in the art, and may include friction, centrifugal, diaphragm, positive, hydraulic, electromagnetic, or vacuum clutches, as non-limiting examples.

Figure 15:
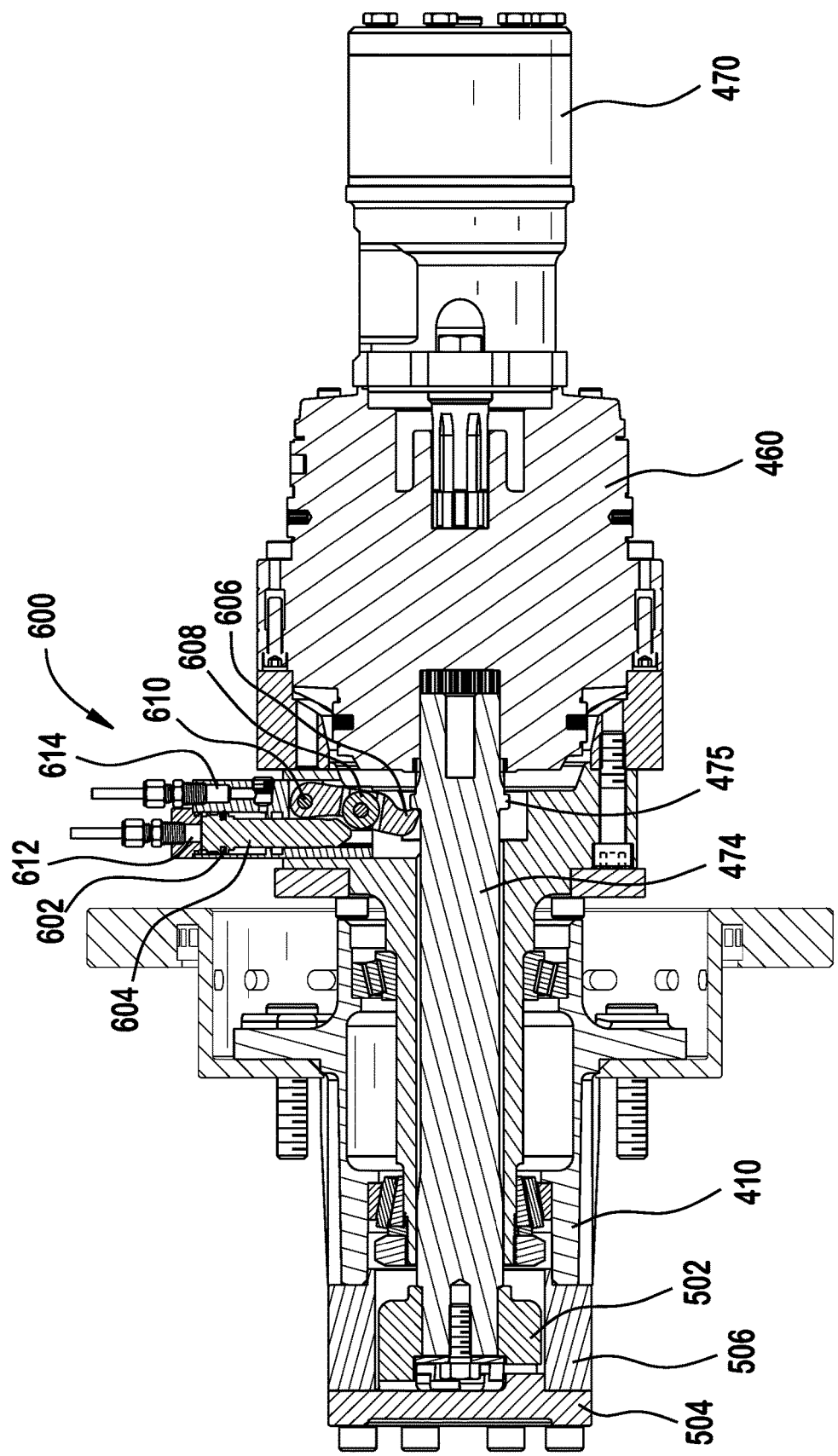
FIG. 15 is a cross-section view of components of the wheel hub assembly.
Figure 16A:
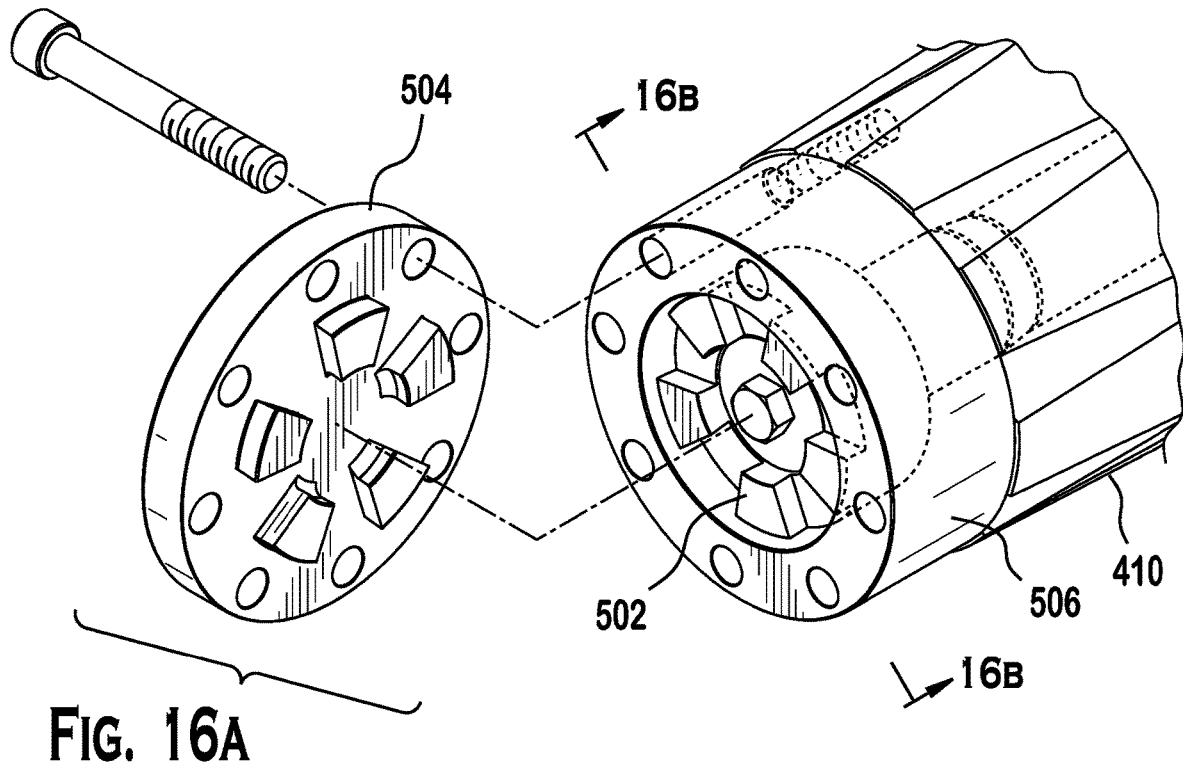
FIG. 16A is close up view of the clutch assembly, depicting the driving and driven clutch elements.
Figure 16B:
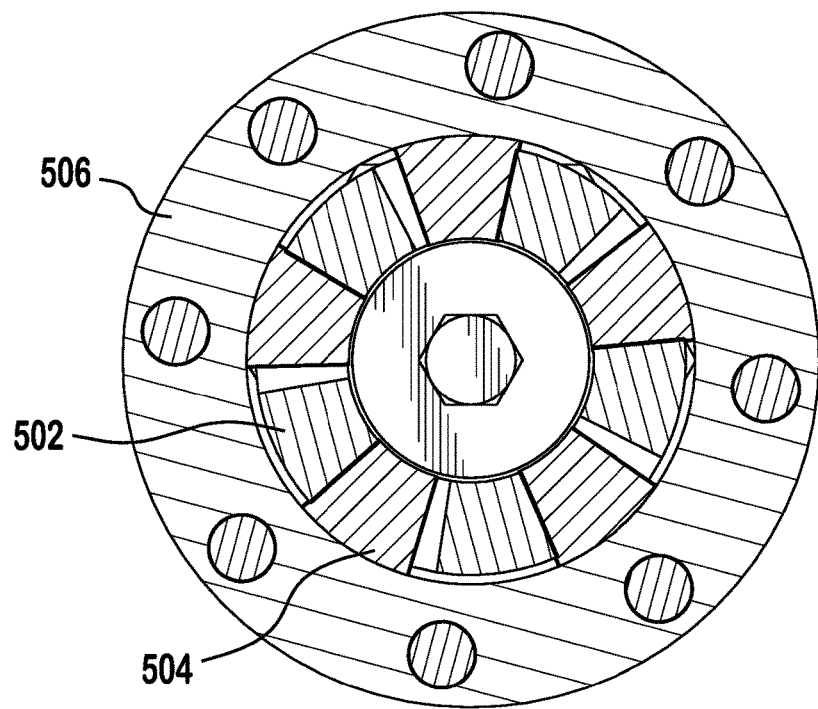
FIG. 16B is a cross-section view through the engaged clutch elements, depicting the teeth of each of the driving clutch element against the teeth of the driven clutch element.

As can be seen with reference to FIGS. 15, 16A and 16B, the clutch assembly 500 will be engaged or disengaged with the lateral shifting of the flanged driveshaft 474. While the driveshaft is in the first position, the teeth of the driving clutch element 502 will be engaged with the receiving elements (such as teeth) of the driven clutch element 504, in order to positively transmit the rotation of the flanged driveshaft 474 through the clutch 500 elements and to the wheel hub 410. While the flanged driveshaft 474 is in the second position, the teeth of the driving clutch element 502 will not be engaged with the receiving elements of the driven clutch element 504, as the lateral shift of the driveshaft 474 is enough to separate the driving clutch element 502 from the driven clutch element 504. Thus, so long as the driveshaft 474 remains in the second position, the driveshaft 474 may be caused to rotate by the motor, and the driving clutch element 502 will also rotate, yet there as there is no contact between the driving clutch element 502 and the driven clutch element 504, then the driven clutch element 504, wheel hub 410 and wheel will remain isolated from movement of the driveshaft and motor, if any; moreover, while the trailer 1' is being towed, the driven clutch element 504, wheel hub 410 and wheel will be free to turn, without affecting the driveshaft 474 and motor 470.

Figure 17:
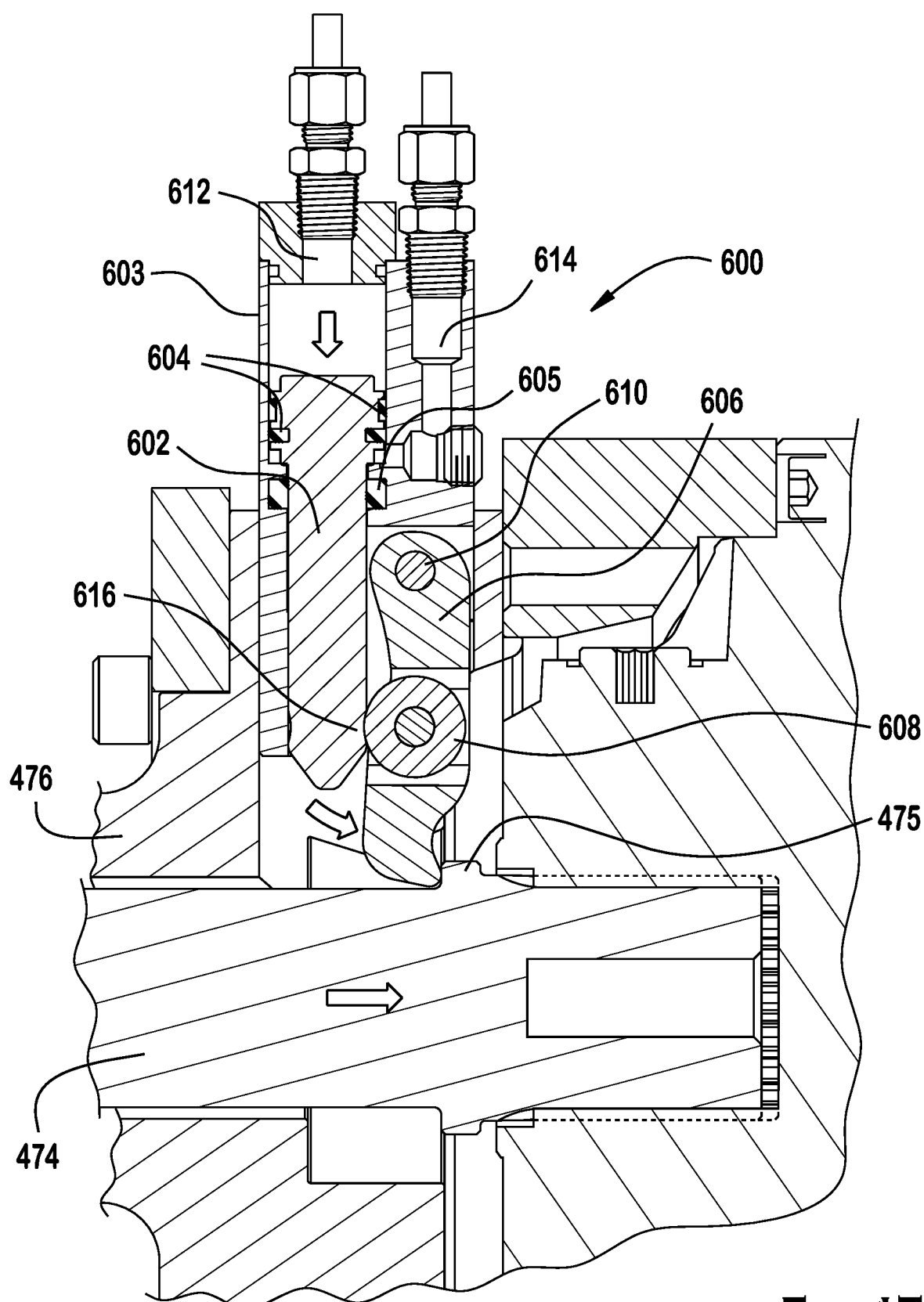
FIG. 17 depicts a close up, cross-section view of the locking mechanism and driveshaft
Figure 18:
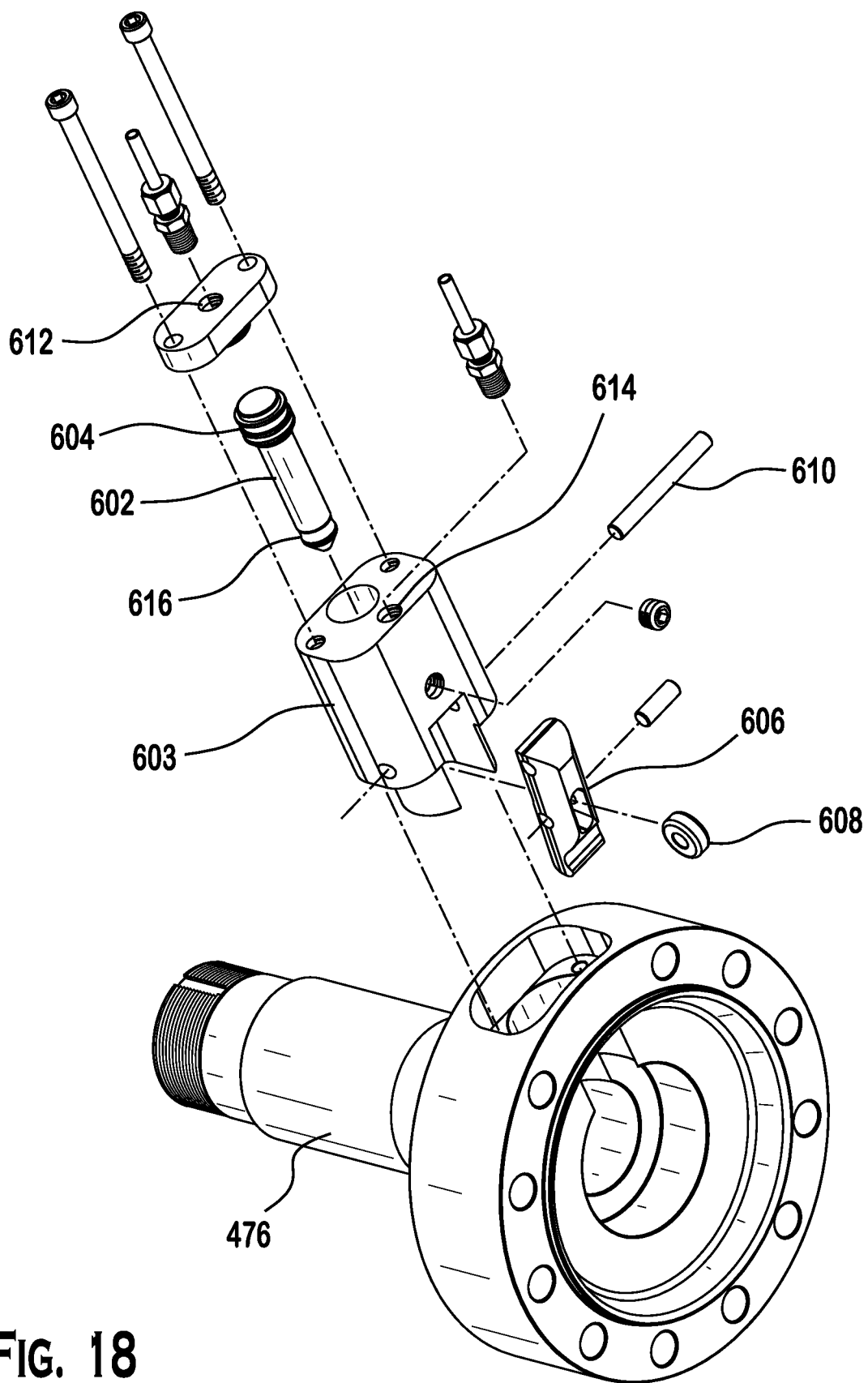
FIG. 18 depicts an exploded view of the locking mechanism elements and bell housing.

To actuate the lateral movement of the flanged driveshaft 474 in order to engage and disengage the clutch, the wheel hub assembly may be provided with a locking mechanism 600, which may be any suitable actuation, including manual, electric, hydraulic, or pneumatic operation. In the exemplary embodiment depicted in FIG. 15, and in greater detail in FIG. 17, the locking mechanism 600 provides a hydraulic actuator, and comprises at least one of each of a pushing member 602 and one or more seals 604 configured to slidingly reciprocate within a pushing member receptacle 603, an urging member 606, a roller 608, and a pivot pin 610, which may be fitted within the confines of the pushing member receptacle. The seals 604 may be O-rings that are mounted on the body of the pushing member, and may partially resided within O-ring grooves on the pushing member. An exploded view of the components of the locking mechanism 600 is depicted in FIG. 18, depicting the locking mechanism as a cartridge component that may be fitted into the bell housing 476. As depicted, the pushing member receptacle 603 may be a hollow body, that is configured to slidably accept the pushing member therein, and acts similar to a hydraulic cylinder barrel, in that it is configured to contain hydraulic pressure acting upon the pushing member 602, which acts as a hydraulic cylinder. The pushing member receptacle may be provided with a fixed seal 605, which may be a gland seal or mechanical seal, such as an O-ring, positioned in the pushing member receptacle below the seals on the pushing member, where the fixed seal receives the elongate body portion of the pushing member therethrough, and serves to prevent leakage of hydraulic fluid below the fixed seal. The urging member 606 is secured at one end over a pivot pin 610, and is free to move laterally at the other end. The urging member 606 is normally biased in a direction away from the motor (to the left as depicted in FIG. 15), which may be accomplished using any suitable method, for example, with a spring pushing against the urging member, normally biasing to the left in FIG. 15. When the pushing member 602 is subjected to hydraulic pressure, such as may be applied through the first hydraulic port 612, the pressure above the pushing member seal 604 is increased, and causes the pushing member 602 to be advanced towards the driveshaft 474 (in a downward direction), whereupon the lower portion of the pushing member 602 encounters the roller 608, which is secured to the urging member 606, typically near the mid-point of the urging member. Further advancement of the pushing member 602 causes the roller 608, to be displaced, depicted in a direction to the right in FIGS. 15 and 17, whereupon the urging member 606 will pivot upon the pivot pin 610 securing the end of the urging member, as a fulcrum end. The movement at the free end of the urging member 606 will be magnified by the lever arrangement of the urging member, such that the free end of the urging member is moved to the right and encounters a flange 475 of the driveshaft 474, and thus urges the driveshaft to the right, into the second position of the driveshaft, thereby retracting the teeth of the driving clutch element 502 so as to not be engaged with the driven clutch element 504.

In an embodiment, the pushing member 602 may have a detent 616 that aligns with the roller when the pushing member is advanced downwards. The detent may be in the form of an indentation on the surface of the pushing member 602, that is sized to accommodate at least a portion of the roller 608, so that the roller is received within the indentation. The roller 608, while it is at least partially received within the detent 616, provides resistance to the pushing member returning to the raised position, and maintains the pushing member in the down position, even in the absence of hydraulic pressure at the first port 612. In this manner, the hydraulic system may be depressurized (as may be preferred for towing the trailer between locations), and as the pushing member 602 will remain advanced downward, the urging member 606 will continue to urge the driveshaft 474 to remain in the second position, ensuring the clutch 500 will remain disengaged. Thus, with the clutch disengaged, the trailer 1' may be towed as the hub 410 can free-wheel, without the clutch 500 elements being engaged, and without causing unwanted movement of the motor 470 and transmission 460 components.

Reversal may be accomplished by removing the hydraulic pressure at the first port 612, and increasing the hydraulic pressure through the second hydraulic port 614, which increases the pressure below the seal 604 on the pushing member 602, and above the fixed seal 605. The increased pressure from below the seal 604 of the pushing member 602 will overcome the holding force from the roller 608 residing against the detent 616, and drive the pushing member 602 upwards, away from the driveshaft 474 as the roller 608 leaves the detent 616, and continued movement of the pushing member 602 upwards will free the roller 608 from encountering the pushing member at all, such that the urging member 606, along with the roller 608 may pivot upon the fulcrum of the pivot pin 610 and returns to the initial position, whereby the driveshaft 474 is no longer urged to the second position, and can revert to the first position. With the driveshaft no longer urged away from the motor, the clutch 500 becomes engaged as the teeth of the driving clutch element 502 and driven clutch element 504 become engaged, so that the trailer 1' may be self-propelled by rotation of one or more motors 470.

In an embodiment, it is contemplated that the driven clutch element 504 of FIG. 16A may be reversible, so as to present the recessed surface towards the driving clutch element 502. When reversed in this manner, the clutch 500 will be disengaged, regardless of the position of the driveshaft 474, such that the hub 410 will free-wheel, though remains subject to braking application, as previously described. In this manner, one wheel hub assembly drive may be disabled, as may be necessary in the event of a malfunction, or equipment breakage. Reversal of the driven clutch element 504 is accomplished by removing the fasteners securing the driven clutch element 504, and replacing it with the normally exterior facing recessed surface (as can be seen in FIG. 12A) directed inwards.

Now with reference to the Figures, the control system 60 will be discussed and generally includes a power system source (i.e. combustion engine, battery) and a control assembly connected (hydraulic and electrical lines) to the rear wheel assembly 310, the front wheel assembly 340, and the extension assembly 380.

Regardless of the specific mode of powering the rear wheels 312, the control system 60 controls starting, stopping and turning the rear wheels 312, as well as for regulating the speed of the rear wheels 312. Likewise, the control system 60 also controls starting, stopping and turning the front wheels 342, as well as for regulating the speed of the front wheels 342.

The control system 60 includes a plurality of controls which may be a series of buttons, levers, or other suitable controls which allow the operator to control expansion and retraction of the front wheel assembly 340 using the extension assembly.

In an embodiment, user controls may be provided on the control system 60 for controlling certain other features of the trailer 1. As shown in the embodiment of FIG. 1, an operator stand may sit in operator's box 62, allowing an operator to move along with the trailer 1 as the operator controls the trailer 1 movement. The control system 60 therefore provides the operator with the ability to control all features of the trailer 1 from a single location, while standing on the operator stand and moving along with the trailer 1 as the trailer 1 travels under its own power.

In a trailing position A, the front wheels 342 are positioned adjacent to the rear wheels 312, while in the self-propelled position B the front wheels 342 are positioned to equally support the undercarriage chassis 20 and, more particularly, the storage bin 80.

According to the invention, the front wheels 342 are positioned between the trailing position A and the self-propelled position B by the extension assembly 380.

Now with reference to FIGS. 1-4, the storage bin 80 generally includes a platform 82, a plurality of retaining walls 84, a tailgate 90, and a pair of cover sections 94.

The platform 82 includes a planar section extending substantially parallel with the frame 10. In the shown embodiment, the platform 82 is a rectangular metal plate. However, one skilled in the art should appreciate that the platform 82 could be manufactured using different shapes and other materials, such as lumber, composite, and other metals. For instance, the platform 82 may include a framed metal structure on which a plurality of wood planks are arranged.

The plurality of retaining walls 84 includes a pair of side retaining walls 86 and a retaining end wall 88. In the shown embodiment, each retaining wall 84 is metal plate. However, one skilled in the art should appreciate that each retaining wall 84 could be manufactured using other materials, such as lumber, composite, and other metals. For instance, each retaining wall 84 may include a framed metal structure on which a plurality of wood planks is disposed along the framed metal structure.

The plurality of retaining walls 84 is positioned and secured along outer edges of the platform 82 and, in particular, along a top planar surface thereof. In the shown embodiment, the pair of side retaining walls 86 are positioned along opposite longitudinal sides of the platform 82, while the retaining end wall 88 is positioned at trailing end of the platform 82. Each retaining wall 84 extends substantially perpendicular with respect to the top planar surface of the platform 82. Each retaining wall 84 is mechanically secured to the platform 82, for instance, using a weld or plurality of known mechanical fasteners. In addition, the retaining end wall 88 is secured to a pair of common ends of the side retaining walls 86. In the embodiment shown, the retaining end wall 88 is mechanically secured to the pair of side retaining walls 86, for instance, using a weld or other known mechanical fasteners or adhesives.

As shown, the tailgate 90 is positioned along a leading end of the platform 82, opposite the retaining end wall 88 positioned along the trailing end thereof. In the embodiment shown, the tailgate 90 is made of a metal. However, one skilled in the art should appreciate that the tailgate 90 could be manufactured using other materials, such as lumber, composite, and other metals. For instance, tailgate 90 may include a framed metal structure on which a plurality of wood planks is disposed along the framed metal structure.

As shown, the tailgate 90 is positioned along an outer edge of the platform 82 and extends substantially perpendicular to the top planar surface thereof. The tailgate 90 is secured to the platform 82, for instance, through a rotating fastener device, such as a rotating hinge 92 positioned at bottom of the tailgate 90 and connecting to the platform 82. The rotating hinge 92 permits rotation of the tailgate 90 from a secured closed vertical position to one in which the tailgate 90 rotates away from the retaining end wall 88 making the platform 82 accessible. However, one skilled in the art should appreciate that other design are possible. For instance, the tailgate 90 may be pivotably mounted to side retaining walls 86 such that the tailgate 90 pivots away from the outer edge of the platform 82 or from the side retaining walls 86, much like known dump trucks.

Each cover section 94 is a rectangular metal structure having a planar surface. Each cover section 94 is positioned along and connected to upper outer edges of the pair of side retaining walls 86 using a plurality of hinges 96. However, one skilled in the art should appreciate that other designs are possible. For instance, other known rotating mechanisms could be used. Each cover section 94 measures approximately half a width as measured between the pair of side retaining walls 86.

A pair of stops 98 are provided and positioned along a common side at opposite ends of the cover section 94. In particular, each stop 98 is disposed along an outer edge of the cover section 94 that is proximate to the side retaining wall 86 when assembled. Each stop 98 is a metal plate having one end secured to the cover section 94. In an exemplary embodiment, the stop 98 is semi-circle shaped having a free end configured to abut the side retaining wall 86 when the cover section 94 rotates about the hinge 96. The stop 98 configuration determines that angle at which the cover section 94 is positioned in an open position. For instance, if the stop 98 has a 135 degree semi-circle shape, then the cover section 94 will be positioned at a 45 degree angle with respect to a plane extending across top surfaces of both side retaining walls 86.

In the shown embodiment, a plurality of wall supports 99 are provided and disposed along outer surfaces of the platform 82, the retaining walls 84, the tailgate 90, and the cover sections 94. The wall supports 99 provide reinforcement for the planar surfaces of each of the outer surfaces. In the shown embodiment, each wall support 89 is a tubular structure of metal that is mechanically secured to the outer surfaces, for instance, using a weld. However, one skilled in the art should appreciate that other known fastening means are possible, including but not limited to screws, nuts and bolts, and adhesives.

Now with references to FIGS. 4-6 and 8, the extension device 100 according to the invention will be described. As shown, the extension device 100 includes the following major components: a first extension section 102, a second extension section 120, and a storage bin platform section 180.

As shown, the first extension section 102 is shown and generally includes a pair of lower supports 104 reciprocally connected to the support beams 12 and a lower lifting actuator assembly 106 connected to the front support 16.

Each lower support 104 is an elongated structural support and, in the shown embodiment, a metal plate. Each lower support 104 includes a plurality of fastener receiving through-holes 108 positioned at a trailing end, leading end, and a middle section thereof. The pair of lower supports 104 are positioned parallel, and are rotatably secured to the frame 10 using fasteners. The lower lifting actuator assembly 106 includes a pair of hydraulic actuators connecting to the front support 16 at one end and to the middle section of the lower support 104 at another end thereof using fasteners.

As shown, the second extension section 120 is shown and includes a boom support 122, a sliding support 124, a sliding mechanism 130, an upper lifting actuator assembly 140, and an articulating arm assembly 150.

The boom support 122 is elongated structural beams and, in the shown embodiment, a tubular metal beam. The boom support 122 includes a pair of fastener receiving brackets 123 with through holes positioned at a trailing end thereof and extending completely there through.

As shown, each sliding support 124 is an elongated structural beams having a boom support receiving passageway 126 opening from a trailing end thereof and extending there through a body of sliding support 124. The boom support receiving passageway 126 is shaped to receive the boom support 122 and, as shown, a cross section area of the boom support receiving passageway 126 is larger than a cross section area of the boom support 122. As a result, a leading end of the boom support 122 is positioned through the boom support receiving passageway 126.

In the shown embodiment, each sliding support 124 is a tubular metal beam. Each sliding support 124 includes a fastener receiving through-hole 128 positioned at a leading end thereof and extending completely there through.

The sliding mechanism 130 is positioned between and connected to the boom support 122 and the boom support receiving passageway 126.

Each sliding mechanism 130 includes an actuator section 132 which may be a known hydraulic cylinder having a barrel, a piston, piston rod, seals, and seal glands. However, one skilled in the art should appreciate that other actuator systems operated by a source of energy, such as electric current, hydraulic fluid pressure, or pneumatic pressure.

In the shown embodiment, the upper lifting actuator assembly 140 includes a pair of hydraulic actuators 142 is positioned between frame 10 and the second extension section 120. Each hydraulic actuators 142 includes an actuator 174 which may be a known hydraulic cylinder having a barrel, a piston, piston rod, seals, and seal glands. However, one skilled in the art should appreciate that other actuator systems operated by a source of energy, such as electric current, hydraulic fluid pressure, or pneumatic pressure.

As shown, in an exemplary embodiment of the invention, the articulating arm assembly 150 is a pair of plate like members (see FIG. 8) rotatably connected to the sliding support 124 and the storage bin 180 using the storage bin platform section As shown, the storage bin platform section 180 is shown and generally includes a platform 182, a platform cross member 184, a tilting actuator cross member (not shown), and a pair of bin tilting actuators (not shown).

Now with reference to FIGS. 1, 10, and 11, operation of the trailer 1 or 1' according to the invention will be described.

Building materials can be loaded and secured in the storage bin 80 at a location different than the work site. A truck (not shown) connects to the frame 10 using the trailer hitch 22. The operator positioned the front wheel assembly 340 apart from the rear wheel assembly 310 using the extension assembly 380. The front wheel assembly 340 and the rear wheel assembly 310 are set to drive and steer using the control system 60. The trailer 1 or 1' then can operate as a standard trailer and be towed behind the connected truck to the work site.

The operator then uses the control system 60 to move the trailer 1 or 1' to a desired location on the work site using the drive system of the front wheel assembly 340 and the rear wheel assembly 310, as described above. The operator may now use the control system 60 to stabilize the trailer 1 or 1'.

Once the operator has determined that the trailer 1 is in position to unload building materials from the storage bin 80, the operator can manage the stabilizers (not shown), as known and well understood by those skilled in the art, to stabilize and level the trailer 1 or 1'. The operator then uses the control system 60 to control the extension device 100 and position of the storage bin 80.

The operator can use the control system 60 to control the vertical and horizontal position of the storage bin 80. In addition, the operator can slide the storage bin 80 horizontally with respect to frame 10.

The foregoing illustrates some of the possibilities for practicing the invention. Many other embodiments and fields of use for the trailer 1 or 1' are possible and within the scope and spirit of the invention. It is, therefore, intended that the foregoing description be regarded as illustrative rather than limiting.

What is claimed is:

1. A vehicle drive system:
  a hub assembly having a wheel hub upon which a wheel assembly is secured;
  a drive assembly configured to selectively transmit a motive force to cause the hub to turn, the drive assembly includes:
    a motor with a rotatable motor output shaft;
    a transmission assembly connected to the motor and receiving in the rotatable motor output shaft into an input opening therein;
    a driveshaft extending through the wheel hub upon which the wheel is to be mounted and connected to an output from the transmission assembly; and
  a clutch assembly connected to the hub assembly and engageable to the driveshaft, the clutch assembly having:
    a first end that mechanically engages with a transmission output and an opposite second end that is keyed so as to be mechanically engaged with a first driving clutch element of the clutch assembly, and
    a second driven clutch element secured to the wheel hub with a spacer positioned there between,
    wherein the driveshaft laterally slides towards and away from the transmission output while remaining mechanically engaged with the transmission output that is keyed to correspond with the driveshaft in order to accept and positively engage the driveshaft.

2. The vehicle drive system of claim 1, wherein the first driven clutch element slidably engages with the second driven clutch element.

3. The vehicle drive system of claim 2, further comprising a locking mechanism for selectively engaging the first driven clutch element and the second driven clutch element.

4. The vehicle drive system of claim 3, wherein the locking mechanism urges a lateral movement of the driveshaft towards and away from the transmission output and engaging and disengaging the first driven clutch element and the second driven clutch element.

5. The vehicle drive system of claim 3, wherein the locking mechanism includes:
  a pushing member having a detent and configured to reciprocate between a first position and second position;
  a pushing member receptacle configured to receive the pushing member;
  an urging member secured at one end by a pivot pin, and having a roller capable of at least partially residing within the detent while in the second position, the roller secured to the urging member;
  the urging member being normally biased in a first direction, and moved in a second direction by the pushing member, such that the roller resides at least partially within the detent, while the urging member is pushed in the second direction, the urging member having a free end configured to urge a lateral movement of a driveshaft to disengage the clutch assembly, while the urging member is moved in a second direction.

6. The vehicle drive system of claim 5, wherein pushing member is hydraulically actuated.

7. The vehicle drive system of claim 1, wherein the motor is a hydraulic motor.

8. A vehicle drive system:
  a hub assembly having a wheel hub upon which a wheel assembly is secured;
  a drive assembly configured to selectively transmit a motive force to cause the hub to turn, the drive assembly includes:
    a motor with a rotatable motor output shaft;
    a transmission assembly connected to the motor and receiving in the rotatable motor output shaft into an input opening therein;
    a driveshaft connected to an output from the transmission assembly;
  a clutch assembly connected to the hub assembly and engageable to the driveshaft, a pushing member having a detent and configured to reciprocate between a first position and second position;
  a pushing member receptacle configured to receive the pushing member;
  an urging member secured at one end by a pivot pin, and having a roller capable of at least partially residing within the detent while in the second position, the roller secured to the urging member;
  wherein the urging member being normally biased in a first direction, and moved in a second direction by the pushing member, such that the roller resides at least partially within the detent, while the urging member is pushed in the second direction, the urging member having a free end configured to urge a lateral movement of a driveshaft to disengage the clutch assembly, while the urging member is moved in a second direction.

9. The vehicle drive system of claim 5, wherein pushing member is hydraulically actuated.

* * * * *